(12) United States Patent
Tensingh et al.

(10) Patent No.: US 12,490,220 B2
(45) Date of Patent: Dec. 2, 2025

(54) METHODS, USER EQUIPMENT, AND NETWORK ENTITY FOR HANDLING RESOURCE IN WIRELESS NETWORK

(71) Applicant: SAMSUNG ELECTRONICS CO., LTD., Suwon-si (KR)

(72) Inventors: Shrinithi Andal Tensingh, Bengaluru (IN); Chetan Ramesh Ganig, Bengaluru (IN); Prasad Basavaraj Dandra, Bengaluru (IN); Umasankar Baskar Ceendhralu, Bengaluru (IN); Danish Ehsan Hashmi, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 17/822,817

(22) Filed: Aug. 29, 2022

(65) Prior Publication Data

US 2023/0067614 A1     Mar. 2, 2023

(30) Foreign Application Priority Data

Aug. 27, 2021   (IN) .............................. 202141038907

(51) Int. Cl.
*H04W 60/06*     (2009.01)
*H04W 8/02*      (2009.01)
(Continued)

(52) U.S. Cl.
CPC ............. *H04W 60/06* (2013.01); *H04W 8/02* (2013.01); *H04W 36/14* (2013.01); *H04W 48/02* (2013.01)

(58) Field of Classification Search
CPC ....... H04W 60/06; H04W 8/02; H04W 36/14; H04W 48/02; H04W 36/08; H04W 68/00;
(Continued)

(56) References Cited

U.S. PATENT DOCUMENTS 9,661,676 B2 * 5/2017 Liu ...................... H04W 76/18
9,930,517 B2   3/2018 Chen
(Continued)

FOREIGN PATENT DOCUMENTS

JP        6696580      4/2020
WO     2017-189038    11/2017
(Continued)

OTHER PUBLICATIONS

Extended European Search Report dated Jan. 24, 2023 in corresponding European Patent Application No. 22192584.5 (13 pages).
(Continued)

*Primary Examiner* — Kabir A Timory
(74) *Attorney, Agent, or Firm* — Wolf, Greenfield & Sacks, P.C.

(57) ABSTRACT

Embodiments disclosed herein relate to methods for handling a resource in a wireless network by a UE 100. The method includes receiving a reject cause message from a network entity. The UE does not support a redirected radio access technology (RAT) indicated in the reject cause message. Further, the method includes considering the reject cause message to represent an abnormal case and performing at least one action based on the abnormal case. The method can be used for enabling enhanced NAS procedure in CIoT devices. The method can also be used to indicate the change in support of CP/UP preference when both CP and UP CIoT optimization are supported, so as to reduce the signalling overhead in the wireless network, improve the UE behavior and NAS procedural efficiencies.

17 Claims, 24 Drawing Sheets

(51) Int. Cl.
*H04W 36/14* (2009.01)
*H04W 48/02* (2009.01)

(58) Field of Classification Search
CPC ..... H04W 76/27; H04W 60/00; H04W 76/18; Y02D 30/70
See application file for complete search history.

(56) References Cited

U.S. PATENT DOCUMENTS

| | | | |
|---|---|---|---|
| 10,616,936 | B2 | 4/2020 | Velev et al. |
| 10,721,612 | B2 | 7/2020 | Ryu et al. |
| 10,772,033 | B2 * | 9/2020 | Moisanen ............ H04B 7/0452 |
| 10,827,542 | B2 | 11/2020 | Gupta et al. |
| 10,887,927 | B2 | 1/2021 | Wass et al. |
| 11,109,259 | B2 | 8/2021 | Ianev et al. |
| 11,259,208 | B2 | 2/2022 | Kim et al. |
| 2018/0324592 | A1 * | 11/2018 | Manepalli ............ H04W 12/06 |
| 2019/0021130 | A1 | 1/2019 | Kim et al. |
| 2021/0120465 | A1 | 4/2021 | Zhu et al. |
| 2021/0321477 | A1 * | 10/2021 | Niemi ................... H04W 76/18 |

FOREIGN PATENT DOCUMENTS

| | | |
|---|---|---|
| WO | 2021-162477 | 8/2021 |
| WO | 2021-235878 | 11/2021 |

OTHER PUBLICATIONS

Mediatek Inc., "Discussion on inter-system redirection for CIoT", 3GPP Draft; C1-205144, 3rd Generation Partnership Project(3GPP), Mobile Competence Centre; 650, Route Des Lucioles; F-06921 Sophia-Antipolis Cedex; France, CT WG1, Electronic meeting; Aug. 20, 2020-Aug. 28, 2020, Aug. 13, 2020, XP051919637, 2 pages.

"3rd Generation Partnership Project; Technical Specification Group Core Network and Terminals; Non-Access-Stratum (NAS) protocol for 5G System (5GS); Stage 3; (Release 17)", 3GPP Standard; Technical Specification; 3GPP TS 24.501, Jun. 28, 2021, pp. 1-825, XP052029852, 825 pages.

Samsung: "Redirection of UE from N1 mode to S1 mode", 3GPP Draft; CP-201097, 3rd Generation Partnership Project(3GPP), Mobile Competence Centre; 650, Route Des Lucioles; F-06921 Sophia-Antipolis Cedex; France, CT WG1, Jun. 19, 2020, XP051902217, 18 pages.

Huawei et al., "Discussion on CIoT steering and redirection betwwen EPS and 5GS", C1-192183 DISC 5G CIoT Steering and Redirection Betwwen EPS and 5GS, 3rd Generation Partnership Project(3GPP), Apr. 2, 2019, XP051705380, 5 pages.

Apple, et al., "Disabling of N1 capabilities when all requested S-NSSAIs subjected to NSSAA are rejected due to failure of NSSAA or when no slice is available for UE", 3GPP Draft; CP-202156, 3rd Generation Partnership Project (3GPP), Sep. 4, 2020, XP051929562, 29 pages.

* cited by examiner

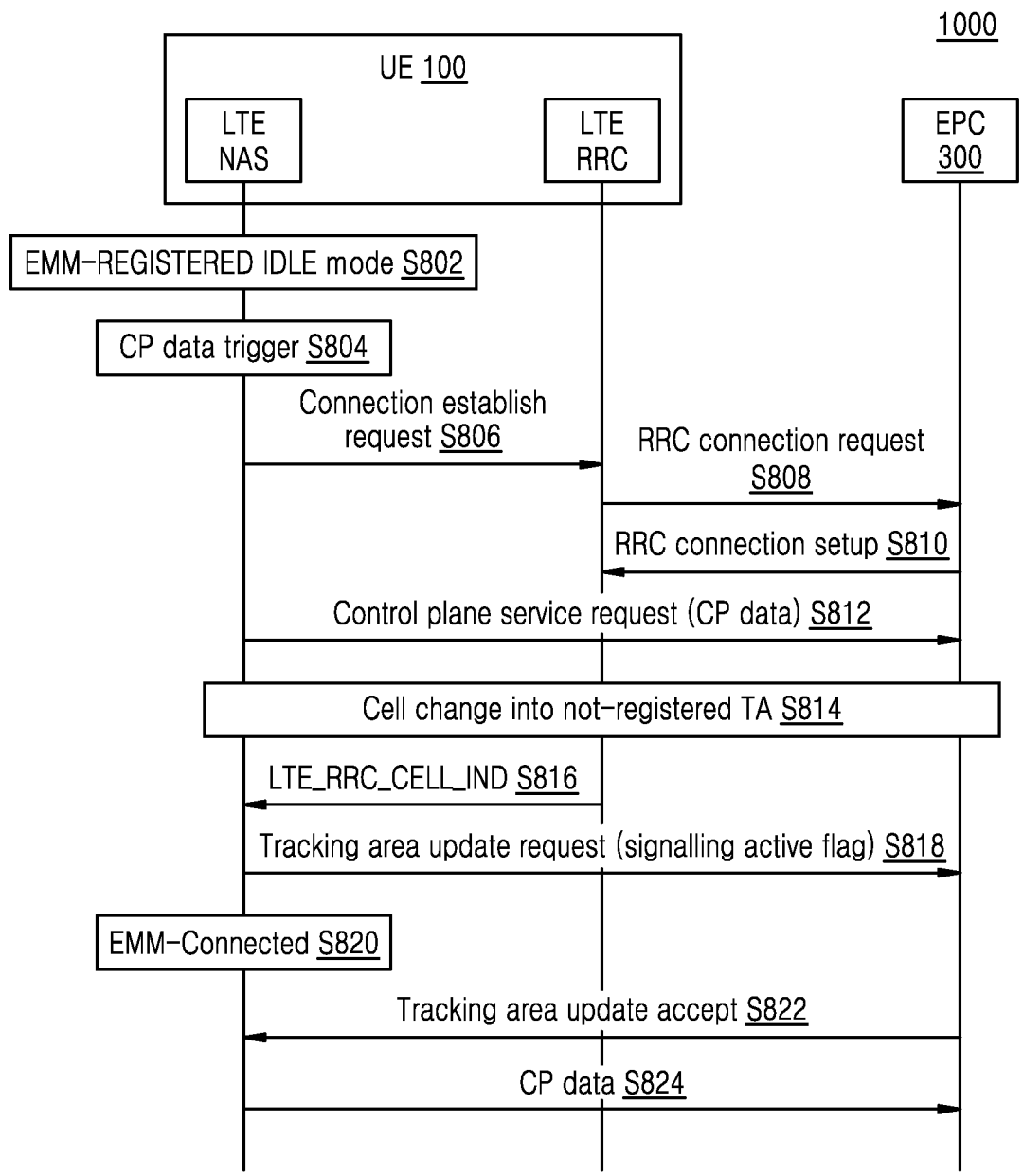

METHODS, USER EQUIPMENT, AND NETWORK ENTITY FOR HANDLING RESOURCE IN WIRELESS NETWORK

CROSS REFERENCE TO RELATED APPLICATION(S)

This application is related to and claims priority under 35 U.S.C. 119 to Indian application no. 202141038907, filed in the Indian patent office on Aug. 27, 2021, the content of which are incorporated by reference herein in its entirety.

TECHNICAL FIELD

Embodiments disclosed herein relate to methods, user equipment (UE), and a network entity for handling a resource in wireless networks, and more particularly to enable Non-access stratum (NAS) procedures in the UE (e.g., Cellular Internet of Things (CIoT) device or the like) in the wireless networks.

DISCUSSION OF RELATED ART

CIoT devices provide various optimizations in terms of signalling enhancements for sending small data and Short Message Service (SMS). Yet there are some procedures in the CIoT devices that could use improvement to overcome a inefficiencies such as: delay in obtaining normal services; delay in resuming data sessions; resource wastage due to unnecessary user plane establishment; becoming stuck in a connected state with no uplink (UL) or downlink (DL) services; excessive power consumption in the UE; inconsistent UE behavior; UE capability mismatch between the UE and the network leading to procedural failures; becoming stuck in a LIMITED SERVICE state where the UE is allowed only emergency services even though the UE can avail normal services for non-CIoT related features; and so on.

FIGS. 1-6 depict various problem scenarios while enabling the NAS procedures in a UE 100, according to prior art methods.

The network can redirect the UE 100 that supports CIoT optimizations from an Evolved Packet Core (EPC) 300 to a fifth generation core (5GC) 200 by sending a reject cause #31. On receiving cause #31, the UE 100 has to disable a current Radio Access Technology (RAT) mode and camp on a cell of a redirected RAT. If the network sends this reject cause without considering the UE's support of the redirected RAT, currently there are no actions to be taken specified in the 3$^{rd}$ Generation Partnership Project (3GPP) specification. Thus, the UE's behavior in each of the following cases is not defined:

1. The UE operates in N1 mode, does not support S1 mode and receives cause #31 (interchangeably, just "#31") "redirection to EPC required", and
2. The UE operates in S1 mode, does not support N1 mode and receives #31 "redirection to 5GC required".

5.5.1.2.5 Initial registration not accepted by the network (specification reference: 24.501):

Based on an operator policy, if the initial registration request is rejected due to core network redirection for the UE using CIoT optimizations, the network shall set the 5GMM cause to #31 "Redirection to EPC required". The network can take into account the UE's S1 mode capability, the EPS CIoT network behavior preferred by the UE 100 or the EPS CIoT network behavior supported by the EPC 300 to determine the rejection with the 5GMM cause #31 "Redirection to EPC required".

31 (Redirection to EPC required): 5GMM cause #31 received by a UE 100 that has not indicated support for CIoT optimizations or received by a UE 100 over non-3GPP access is considered an abnormal case and the behavior of the UE 100 is specified in subclause 5.5.1.2.7. This cause received from a cell belonging to an SNPN is also considered an abnormal case and the behavior of the UE 100 is specified in subclause 5.5.1.2.7. This subclause dictates that the UE 100 shall set the 5GS update status to 5U3 ROAMING NOT ALLOWED (and shall store it according to subclause 5.1.3.2.2) and shall delete any 5G-GUTI, last visited registered TAI, TAI list and ngKSI. Additionally, the UE 100 shall reset the registration attempt counter. The UE 100 shall enable the E-UTRA capability if it was disabled, disable the N1 mode capability for 3GPP access (see subclause 4.9.2) and enter the 5GMM-DEREGISTERED.NO-CELL-AVAILABLE.

As shown in FIG. 1, at S102, in the UE 100, power ON triggered, layers initialization is done and SIM read completed. At S104, the NR NAS triggers the registration procedure. At S106, the NR NAS sends a REGISTRATION REQUEST message including a S1 mode not supported and CP CIoT to the 5GC 200. At S108, the 5GC 200 sends the REGISTRATION ACCEPT message including the N3 signalling and CP CIoT to the NR NAS based on the REGISTRATION REQUEST message. At S110, the NR NAS sends a PDU SESSION ESTABLISHMENT REQUEST to the 5GC 200. At S112, the 5GC 200 sends a PDU SESSION ESTABLISHMENT ACCEPT (control plane only) to the NR NAS. At S114, a PDU session is established between the UE 100 and the 5GC 200. At S116, the 5GC 200 sends a RRC connection release to the NR RRC. At S118, the NR NAS moves into a 5GMM-IDLE mode. At S120, the 5GC 200 disables the CP CIoT optimization. At S122, the NR NAS sends the REGISTRATION REQUEST message (including the S1 mode not supported and CP CIoT) to the 5GC 200. At S124, the 5GC 200 sends the REGISTRATION REJECT message (including the 5GMM Cause #31) to the NR NAS based on the REGISTRATION REQUEST message. At S126, the NR NAS moves into the 5GMM-REGISTERED LIMITED SERVICE mode. At S128, the S1 mode is not supported at UE 100. Since S1 mode is not supported, no further actions are taken at the UE side.

In other words, the UE 100 is operating in the N1 mode and is using CP-CIoT optimizations. The UE 100 does not support S1 mode. The UE 100 has sent REGISTRATION REQUEST to the network for pending CP data. The network sends REGISTRATION REJECT with cause #31 "redirection to EPC required". The UE 100 enters REGISTERED LIMITED SERVICE state and disables N1 mode capability. Since S1 mode is not supported, no further actions are taken at the UE side.

As shown in FIG. 2, setting the active flag in Tracking Area Update (TAU) REQUEST message is mandatory as per the current specification if the TAU procedure is triggered during an ongoing service request procedure. Setting the active flag is for requesting the network for Data Radio Bearer (DRB) establishment. Thus, when a TAU procedure is initiated due to a cell change into an unregistered tracking area or other reason during an ongoing service request procedure in a UE100 that does not use CP-CIoT optimizations, TAU REQUEST sent with the active flag set indicates a request involving both procedures. In the case of an ongoing control plane service request procedure (CPSR), DRB establishment is not the only successful completion of the procedure. Since the CP-CIoT allows the UE 100 to send data in the control plane also, the DL message from the network (SERVICE ACCEPT, AUTHENTICATION REQUEST) would even be considered a successful completion of CPSR procedure. During an ongoing CPSR procedure due to paging, pending CP data or pending signalling messages, if the TAU procedure is triggered, it is unnecessary to request DRB establishment. The CP data or the signalling message can be sent over the control plane using the NAS signalling connection as the device is using CP CIoT and establishment of user plane would not be required. Similarly, if the UE 100 has only CP bearers established, the request for DRB establishment from the UE 100 by sending the TAU REQUEST message with active flag would prove to be conflicting.

5.6.1.6 Abnormal cases in the UE (Spec reference: 24.301) (as shown in FIG. 2)

Tracking area updating procedure is triggered: The UE 100 shall abort the service request procedure, stop timer T3417, T3417ext or T3417ext-mt if running and perform the tracking area updating procedure. The "active" flag shall be set in the TRACKING AREA UPDATE REQUEST message. If the service request was initiated for CS fallback or 1xCS fallback, and the CS fallback cancellation request was not received, the UE 100 shall send the EXTENDED SERVICE REQUEST message to the MME by using the existing NAS signalling connection after the completion of the tracking area updating procedure.

5.5.3.2.2 Normal and periodic tracking area updating procedure initiation: If a UE 100 has established PDN connection(s) and uplink user data pending to be sent via user plane when it initiates the tracking area updating procedure, or uplink signalling not related to the tracking area updating procedure when the UE 100 does not support control plane CIoT EPS optimization, it may set the "active" flag in the TRACKING AREA UPDATE REQUEST message to indicate the request to establish the user plane to the network and to keep the NAS signalling connection after the completion of the tracking area updating procedure.

Normal and periodic tracking area updating procedure accepted by the network (Spec reference: 24.301 5.5.3.2.4) If the "active" flag is set in the TRACKING AREA UPDATE REQUEST message and control plane CIoT EPS optimization is not used by the MME, the MME shall re-establish the radio and S1 bearers for all active EPS bearer contexts. If the "active" flag is set in the TRACKING AREA UPDATE REQUEST message and control plane CIoT EPS optimization is used by the MME, the MME shall re-establish the radio and S1 bearers for all active EPS bearer contexts associated with PDN connections established without Control plane only indication.

In other words, the UE 100 is using the CP-CIoT optimization. The UE 100 has sent the CPSR to the network for pending CP data. The UE 100 moves into a not-registered tracking area. The TAU REQUEST is sent with the active flag set. The network sends TAU ACCEPT and establishes DRBs for non-CP bearers. CP data is sent to the network and UE 100 remains in connected mode with the user plane established.

As shown in FIG. 2, at S202, the LTE NAS is in an EMM-REGISTERED IDLE mode. At S204, the LTE NAS triggers the CP data. At S206, the LTE NAS sends a connection establish request to the LTE RRC. At S208, the LTE RRC sends a RRC connection request to the EPC 300. At S210, the EPC 300 sends a RRC connection setup to the LTE RRC. At S212, the LTE NAS sends a CPSR (including the CP data) to the EPC 300. At S214, the UE 100 determines that the cell change into not-registered TA. At S216, the LTE RRC sends a LTE_RRC_CELL_IND to the LTE NAS. At S218, the LTE NAS sends a TRACKING AREA UPDATE REQUEST (including the active flag) to the EPC 300. At S220, the LTE NAS is in an EMM-CONNECTED mode. At S222, the EPC 300 sends a TRACKING AREA UPDATE ACCEPT to the LTE NAS. At S224, the EPC 300 sends the RRC connection reconfiguration to the LTE RRC. At S226, the LTE RRC sends a RRC connection reconfiguration complete to the EPC 300. At S228, the DRB is established between the UE 100 and the EPC 300. At S230, the LTE NAS sends the CP data to the EPC 300. At S232, the LTE NAS is in the EMM-CONNECTED mode.

As shown in FIGS. 3A, 3B and 4, the CIoT optimizations are provided by both the UEs 100 that support LTE and NR. The network can redirect CIoT UEs from one core network to the other supported core network due to operator policies and other reasons by sending reject cause #31. In current specification (Spec 23.501, sec 5.31.3 and 24.501, sec 4.8.4A.2), the network trigger redirection when the UE 100 performs registration or service request procedure and spec also defined redirection procedures for 5G UEs in connected mode. Considering the scenario where the UE 100 does not perform any registration update or service request procedure and remains in IDLE mode for a long duration of time. If the network has to redirect the UE 100 to the other supported core network, currently the network has to wait till the UE 100 performs any of the above mentioned procedures to redirect the UE 100 by sending reject cause #31. Here, the network cannot predict when UE 100 by itself will move to connected state or when the UE 100 would trigger any request; the network may not be in state to redirect at that time, so when the network has to redirect the UE 100 due to load redistribution or if the supported or preferred network behavior has changed due to operator policies or roaming agreements, it is expected that the relevant information is conveyed to the UE 100 at the earliest.

4.8.4A.2 Redirection of the UE by the core network (Spec reference: 24.501) The network that supports CIoT optimizations can redirect the UE 100 between the EPC 300 and 5GCN as specified in subclause 5.31.3 of 3GPP TS 23.501. The network can take into account the UE's N1 mode capability or S1 mode capability, the CIoT network behavior supported and preferred by the UE 100 or the CIoT network behavior supported by the network to determine the redirection. It is assumed that the network would avoid redirecting the UE back and forth between EPC 300 and the 5GCN. The network redirects the UE 100 to the EPC 300 by rejecting the REGISTRATION REQUEST with the 5GMM cause #31 "Redirection to EPC required" as specified in subclause 5.5.1.2.5 and 5.5.1.3.5. Upon receipt of the reject message, the UE 100 disables the N1 mode capability for 3GPP access as specified in subclause 4.9.2 and enables the E-UTRA capability if it was disabled in order to move to EPC 300.

Paging procedure The paging procedure is performed only in 3GPP access and used by the network to request the establishment of a NAS signalling connection to the UE 100. The paging procedure is also used by the network to request the UE 100 to re-establish the user-plane resources of PDU sessions for downlink user data transport. Another purpose of the paging procedure is to request the UE 100 to re-establish the user-plane resources of PDU session(s) associated with non-3GPP access over 3GPP access. Additionally, the network can use the paging procedure to initiate the mobile terminating SMS 5.3.19.2 Redirection of the UE by the core network (Spec reference: 24.301: The network that supports CIoT optimizations can redirect the UE 100 between the EPC 300 and 5GCN as specified in subclause 5.31.3 of 3GPP TS 23.501. The network can take into account the UE's N1 mode capability or S1 mode capability, the CIoT network behavior supported and preferred by the UE 100 or the CIoT network behavior supported by the network to determine the redirection. It is assumed that the network would avoid redirecting the UE back and forth between EPC 300 and 5GCN. The network redirects the UE to 5GCN by rejecting the attach request, or TRACKING AREA UPDATE REQUEST, or service request with the EMM cause #31 "Redirection to 5GCN required" as specified in 3GPP TS 24.501 subclause 5.5.1.2.5, 5.5.1.3.5, 5.5.3.2.5, 5.5.3.3.5 and 5.6.1.5. Upon receipt of reject message, the UE 100 disables the E-UTRA capability as specified in subclause 4.5 and enables the N1 mode capability if it was disabled in order to move to 5GCN.

5.6.2 Paging procedure The paging procedure is used by the network to request the establishment or resumption of a NAS signalling connection to the UE 100. Another purpose of the paging procedure is to prompt the UE 100 to reattach if necessary as a result of a network failure. If the UE 100 is not attached when it receives a paging for EPS services, the UE 100 shall ignore the paging. Additionally, the network can use the paging procedure to initiate the mobile terminating CS fallback procedure or SMS or user data transfer via the MME.

In other words, the UE is using CP CIoT optimization and is in IDLE mode. The AMF/MME has deemed that the support of CP CIoT optimization is not available anymore due to the changed operator policies. After a few hours, the UE 100 wakes up to send time-critical information to the network. The network does not provide CP CIoT support and sends SERVICE REJECT with cause #31. The UE 100 enters REGISTERED LIMITED SERVICE state and disables N1/S1 mode.

As shown in FIGS. 3A and 3B, at S302, in the UE 100, power ON triggered, layers initialization are done and SIM read is completed. At S304, the NR NAS triggers the registration procedure. At S306, the NR NAS sends the connection establish request to the NR RRC. At S308, the NR NAS sends the REGISTRATION REQUEST message (including the UP CIoT, N3 signalling and CP CIoT) to the 5GC 200. At S310, the 5GC 200 sends the REGISTRATION ACCEPT message (including the N3 signalling and CP CIoT) to the NR NAS. At S312, the NR NAS sends the PDU SESSION ESTABLISHMENT REQUEST to the 5GC 200. At S314, the 5GC 200 sends the PDU SESSION ESTABLISHMENT ACCEPT (including the control plane only) to the NR NAS. At S316, the PDU session is established between the UE 100 and the 5GC 200. At S318, the 5GC 200 sends the RRC connection release to the NR RRC. At S320, the NR NAS is in the 5GMM-IDLE mode. At S322, the 5GC 200 disables the CP IoT optimization. At S324, an application running within the UE 100 sends the CP data to the NR NAS. At S326, the NR NAS sends the CONTROL PLANE SERVICE REQUEST (including the CP data) to the 5GC 200. At S328, the 5GC 200 sends the REGISTRATION REJECT message (including the 5GMM Cause #31) to the NR NAS. At S330, the NR NAS moves into the 5GMM-REGISTERED LIMITED SERVICE. At S332, the UE 100 disables the N1 mode and searches for LTE cell.

In other words, the UE is a Delay Tolerant UE registered with 5GC 200 and in IDLE mode. UE B is a high priority user registered with 5GC 200 and in IDLE mode. The UE B is triggering SERVICE REQUEST for CP data transmission. The network is already overloaded and sends SERVICE REJECT with cause #31 to UE-B. The high priority UE is moved to LTE and the low priority UEs in IDLE mode still get to remain in NR As shown in FIG. 4, At S402, the delay tolerant UE is in a 5GMM REGISTERED state. At S404, the delay tolerant UE is in the 5GMM IDLE mode. At S406, a high priority UE is in a 5GMM REGISTERED mode. At S408, the high priority UE is in the 5GMM IDLE mode. At S410, the 5GC 200 detects the overloaded condition. At S412, the application sends a CP data transmission request to the high priority UE 100. At S414, the high priority UE sends the CONTROL PLANE SERVICE REQUEST (including the high priority access) to the 5GC 200. At S416, the 5GC 200 sends the SERVICE REJECT (including the 5GMM cause #31) to the high priority UE based on the CONTROL PLANE SERVICE REQUEST. Based on the SERVICE REJECT, at S418, the high priority UE is in a 5GMM REGISTERED LIMITED SERVICE. At S420, the high priority UE disables a N1 mode and searches for LTE cell.

As shown in FIG. 5, the network can redirect the UE 100 that supports CIoT optimizations from the 5GC 200 the to EPC core network and vice versa based on the CIoT optimizations supported and preferred by the UE 100. Hence it is essential for the UE 100 to indicate any change in the support or preference of CIoT optimizations. Currently there are no NR NAS procedures performed to indicate the network of any change in the UE's preference of using CIoT EPS/5GS optimizations. The CIoT devices being predominantly static in nature do not perform registration procedure often to indicate the changes in the 5GMM capability. Hence it is necessary for the UE to indicate any change in the preference to the network.

4.8.4A.2 Redirection of the UE by the core network (Spec reference: 24.501: The network that supports CIoT optimizations can redirect the UE 100 between EPC 300 and 5GCN as specified in subclause 5.31.3 of 3GPP TS 23.501. The network can take into account the UE's N1 mode capability or S1 mode capability, the CIoT network behavior supported and preferred by the UE or the CIoT network behavior supported by the network to determine the redirection. The network redirects the UE to EPC by rejecting the REGISTRATION REQUEST with the 5GMM cause #31 "Redirection to EPC required" as specified in subclause 5.5.1.2.5 and 5.5.1.3.5. Upon receipt of reject message, the UE disables the N1 mode capability for 3GPP access as specified in subclause 4.9.2 and enables the E-UTRA capability if it was disabled in order to move to EPC 300.

The UE 100 is registered with the network and is using CP CIoT and UP-CIoT optimizations. The UE 100 is configured to prefer use of CP CIoT. The PDU session is established with control plane only indication. The application changes the preference to UP-CIoT optimization. Due to change in operator policies, the network is configured to redirect all UEs which prefer to use CP CIoT, to EPC 300. The application triggers data to be sent to the network. The UE 100 sends the CONTROL PLANE SERVICE REQUEST to the network. The network sends SERVICE REJECT with #31 "Redirection to EPC required" though the UE 100 is not configured to prefer CP CIoT anymore.

As shown in FIG. 5, at S502, in the UE 100, power ON triggered, layers initialization is done and SIM read completed. At S504, the NR NAS triggers the registration procedure. At S506, the NR NAS sends the REGISTRATION REQUEST message including 5GS update type and CP CIoT to the 5GC 200. At S508, the 5GC 200 sends the REGISTRATION ACCEPT message to the NR NAS based on the REGISTRATION REQUEST message. At S510, the NR NAS sends the PDU SESSION ESTABLISHMENT REQUEST to the 5GC 200. At S512, the 5GC 200 sends the PDU SESSION ESTABLISHMENT ACCEPT (control plane only) to the NR NAS.

At S514, the NR NAS is in the 5GMM REGISTERED. At S516, the application sends the change preference to UP CIoT to the NR NAS. At S518, the 5GC 200 sends the RRC connection release to the NR RRC. At S520, the NR NAS moves into a 5GMM-IDLE mode. At S522, the 5GC 200 re-directs the UEs with CP-CIoT preference to the EPC 300. At S524, the application sends the user data to the NR NAS. At S526, the NR NAS sends the CONTROL PLANE SERVICE REQUEST to the 5GC 200. At S528, the 5GC 200 sends the SERVICE REJECT message (including the #31, redirection to EPC required) to the NR NAS based on the CONTROL PLANE SERVICE REQUEST. At S1530, the NR NAS moves into the 5GMM-REGISTERED LIMITED SERVICE state.

As shown in FIG. 6, the CIoT UE on receiving #31 from the network, disables the current RAT support and tries to camp on a cell of the redirected RAT. If a suitable cell supporting the CIoT optimizations supported by the UE is not found, the UE 100 stays in the redirected RAT, enters LIMITED SERVICE and starts the implementation-specific timer. Only on the expiry of this timer, the UE re-enables the current RAT support and proceeds with the appropriate registration procedure. If the UE's CIoT optimizations support or preference changes, there is no provision for the UE to indicate the same to the network leaving the UE stuck in LIMITED SERVICE. This is applicable for both the UEs in N1 mode and in S1 mode.

4.9.2 Disabling and re-enabling of UE's N1 mode capability for 3GPP access (Spec reference: 24.501)

When the UE 100 is disabling the N1 mode capability upon receiving cause #31 "Redirection to EPC required" as specified in subclauses 5.5.1.2.5, 5.5.1.3.5 and 5.6.1.5, it should proceed as follows:

If the UE is in NB-N1 mode: if lower layers cannot find a suitable NB-IoT cell connected to EPC or there is no suitable NB-IoT cell connected to EPC 300 which supports CIoT EPS optimizations that are supported by the UE 100, the UE 100, as an implementation option, may indicate to lower layers to remain camped in E-UTRA cell connected to the 5GCN, may then start an implementation-specific timer and enter the state 5GMM-REGISTERED.LIMITED-SERVICE. The UE 100 may re-enable the N1 mode capability for 3GPP access at expiry of the implementation-specific timer, if the timer had been started, and may then proceed with the appropriate 5GMM procedure.

If the UE is in WB-N1 mode: if lower layers cannot find a suitable E-UTRA cell connected to EPC 300 or there is no suitable E-UTRA cell connected to the EPC 300 which supports CIoT EPS optimizations that are supported by the UE 100, the UE 100, as an implementation option, may indicate to lower layers to remain camped in E-UTRA cell connected to 5GCN, may then start an implementation-specific timer and enter the state 5GMM-REGISTERED.LIMITED-SERVICE. The UE may re-enable the N1 mode capability for 3GPP access at expiry of the implementation-specific timer, if the timer had been started, and may then proceed with the appropriate 5GMM procedure.

4.5 Disabling and re-enabling of UE's E-UTRA capability (Spec reference: 24.301)

When the UE 100 is disabling the E-UTRA capability upon receiving reject cause #31 "Redirection to 5GCN required" as specified in clauses 5.5.1.2.5, 5.5.1.3.5, 5.5.3.2.5, 5.5.3.3.5 and 5.6.1.5, it should proceed as follows:

If the UE is in NB-S1 mode: if lower layers cannot find a suitable NB-IoT cell connected to 5GCN or there is no suitable NB-IoT cell connected to 5GCN which supports CIoT 5GS optimizations that are supported by the UE 100, the UE 100, as an implementation option, may indicate to lower layers to remain camped in E-UTRA cell connected to EPC 300, may then start an implementation-specific timer and enter the state EMM-REGISTERED.LIMITED-SERVICE the UE may re-enable the E-UTRA capability for 3GPP access at expiry of the implementation-specific timer, if the timer had been started, and may then, proceed with the appropriate EMM procedure.

If the UE is in WB-S1 mode: if lower layers cannot find a suitable E-UTRA cell connected to 5GCN or there is no suitable E-UTRA cell connected to 5GCN which supports CIoT 5GS optimizations that are supported by the UE, the UE, as an implementation option, may indicate to lower layers to remain camped in E-UTRA cell connected to EPC 300, may then start an implementation specific timer and enter the state EMM-REGISTERED.LIMITED-SERVICE the UE may re-enable the E-UTRA capability for 3GPP access at expiry of the implementation-specific timer, if the timer had been started, and may then, proceed with the appropriate EMM procedure.

In other words, the UE 100 is operating in N1 mode and supports CP-CIoT optimizations. Due to operator policies, the network is configured to redirect all UEs which prefer to use CP-CIoT to EPC 300. The UE 100 tries to register with the network but REGISTRATION REJECT with cause #31 is received. The UE 100 is not able to find a suitable cell connected to EUTRAN which provides CP-CIoT support. The UE 100 enters EMM-LIMITED SERVICE state and an implementation-specific timer is started. The UE 100 disables CP-CIoT support and has enabled UP-CIoT support but remains in EMM-LIMITED SERVICE state since N1 mode is disabled As shown in FIG. 6, at S602, the NR NAS is in the 5GMM-DEREGISTERED mode. At S604, the 5GC 200 redirects the CP-CIOT UEs to the EPC 300. At S606, UE 100 supports the CP CIoT at the NR NAS. At S608, the NR NAS is in the 5GMM-IDLE mode. At S610, the NR NAS sends the REGISTRATION REQUEST (including the CP-CIoT) to the 5GC 200. Based on the REGISTRATION REQUEST, at S612, the 5GC 200 sends the REGISTRATION REJECT (including the 5GMM cause #31) to the NR NAS. At S614, the LTE NAS and NR NAS disable N1 mode and search for LTE cell. At S616, the LTE RRC sends the RRC_CELL_SEL_FAIL_IND to the LTE NAS. At S618, timer runs in the LTE NAS. At S620, the LTE NAS is in the EMM-DEREGISTERED LIMITED SERVICE. At S622, the application sends the request for disabling the CP-CIoT and enabling the UP-CIoT to the LTE NAS. At S624, the NR NAS moves in the EMM-DEREGISTERED NO CELL AVAILABLE state.

Thus, it is desired to address the above mentioned disadvantages or other shortcomings or at least provide a useful alternative.

SUMMARY

Disclosed herein are methods, a UE, and a network entity for handling a resource in a wireless network while enabling an enhanced NAS procedure in the UE (e.g., CIoT devices or the like).

In various embodiments:

If the network sends a reject cause #31 to a UE which does not support a redirected RAT, the UE may deem it an abnormal case and take corresponding actions according to an ongoing procedure.

If a TAU procedure is triggered due to cell change into an unregistered tracking area or other reason during an ongoing CPSR procedure due to paging, pending uplink CP data or pending signaling messages, a TAU REQUEST may be sent with a signaling active flag set.

If the network entity (e.g., AMF/MME, or the like) determines a core network redirection for the UE using CIoT optimizations is required and the UE is in IDLE mode, the network entity may page the UE and then reject the subsequent service request with EMM cause #31.

Any change in the UE's preference to use CIoT optimizations may be indicated to the network through a registration procedure. For delay tolerant UEs in the IDLE mode, the UE may wait until the next signaling trigger before initiating the registration procedure to change the UE's CIoT configurations.

If the UE has been unable to camp on a cell in a redirected RAT after receiving #31 and the UE's CIoT configuration changes, the UE may stop the timer and proceed with the appropriate procedures.

In embodiments, a method for handling a resource in a wireless network may include receiving, by a UE, a reject cause message from a network entity, where the UE does not support a redirected radio access technology (RAT) indicated in the reject cause message. Further, the UE may consider the reject cause message to represent an abnormal case, and the UE may perform at least one action based on the abnormal case.

In various options:

The reject cause message may include a reject cause #31, and the at least one action may be performed based on an ongoing procedure of the UE.

When the UE is in an N1 mode, the at least one action may include at least one of: the UE enters a 5GMM REGISTERED-ATTEMPTING-REGISTRATION state and attempt counter actions are taken during a registration procedure for an initial registration; the UE enters one of a 5GMM REGISTERED-ATTEMPTING-REGISTRATION-UPDATE state and a 5GMM REGISTERED-NORMAL-SERVICE state and attempt counter actions are taken during a registration procedure for mobility and periodic registration; and/or the UE enters a 5GMM REGISTERED-NORMAL-SERVICE state and locally releases allocated resources during a service request procedure.

When the UE is in an S1 mode, the at least one action may include at least one of: the UE enters a EMM DEREGISTERED-ATTEMPTING-TO-ATTACH state and attempt counter actions are taken during an attach procedure; the UE enters one of an EMM REGISTERED-ATTEMPTING-TO-UPDATE and an EMM REGISTERED-NORMAL-SERVICE state and attempt counter actions are taken during a TAU procedure; or the UE enters an EMM REGISTERED-NORMAL-SERVICE state and locally releases the allocated resources during a service request procedure.

In embodiments, a method for handling a resource includes (i) detecting, by a UE, a trigger of a TAU procedure due to configuration update or mobility when a control plane service request procedure (CPSR) is ongoing; (ii) determining, by the UE, that at least one of pending Control Plane (CP) data, a pending signaling messages and a paging procedure is ongoing; and (iii) sending, by the UE, a TAU REQUEST comprising a signaling active flag set in response to detecting the trigger of the TAU procedure when the CPSR is ongoing on and determining that at least one of the pending CP data, the pending signaling messages and the paging procedure is ongoing.

In embodiments, a method for handling a resource in a wireless network includes: (i) determining, by a network entity, that a core network redirection for the UE using CIoT optimizations is required; (ii) paging the UE if the UE is in an IDLE mode; and (iii) rejecting, by the network entity, the subsequent SERVICE REQUEST with an EMM or 5GMM cause #31 in response to paging. In an example, the network entity includes at least one of an Access and Mobility Management Function (AMF) entity and a Mobility management Entity (MME) entity.

In embodiments, a method for handling a resource in a wireless network includes detecting, by a UE, a change in preference of the UE to use a CIoT optimization. The method further includes indicating, by the UE, the change in preference of the UE to a network entity through a registration procedure. In an example, the change in preference may include at least one of a control plane or a user plane CIoT optimization.

In embodiments, a method for handling a resource in a wireless network includes detecting, by a UE, a change in preference of the UE to use CIoT optimization. The method further includes waiting, by the UE, for a signaling trigger, when the UE is in an IDLE mode and wherein the signaling trigger is initiated before a registration procedure. Further, the method includes indicating, by the UE, the change in preference of the UE to a network entity through the registration procedure.

In embodiments, a method for handling a resource in a wireless network includes: receiving, by a UE, a reject cause #31 from a network entity; and the UE searching, but not finding, a suitable cell in a redirected RAT. The method further includes detecting, by the UE, at least one CIoT configuration change. Further, the method includes stopping, by the UE, a timer; and proceeding, by the UE, with at least one action.

In an example, the at least one action includes at least one of stopping a timer; re-enabling N1 mode support which was disabled earlier; re-enabling S1 mode support which was disabled earlier; camping on a cell of a previous RAT; performing a 5GMM procedure with an updated CIoT configuration; and performing an EMM procedure with the updated CIoT configuration.

In an example, the at least one action is applicable to the UE, when the UEs is in one of a N1 mode and a S1 mode.

In embodiments, a UE for handling a resource in a wireless network includes a resource handling controller coupled to a processor and a memory. The resource handling controller is configured to receive a reject cause message from a network entity. The UE does not support the redirected RAT indicated in the reject cause message. Further, the resource handling controller determines that the reject cause message indicates an abnormal case, and performs at least one action based on the abnormal case.

In embodiments, a UE for handling a resource in a wireless network includes a resource handling controller coupled to a processor and a memory. The resource handling controller is configured to detect a trigger of a TAU procedure when a control plane service request procedure (CPSR) is ongoing. Further, the resource handling controller is configured to determine that at least one of pending Control Plane (CP) data, a pending signaling messages and a paging procedure is ongoing. The resource handling controller is further configured to send a TAU REQUEST comprising a signaling active flag set in response to detecting the trigger of the TAU procedure when the CPSR is ongoing, and determine that at least one of the pending CP data, the pending signaling messages and the paging procedure is ongoing.

In embodiments, a network entity for handling a resource in a wireless network includes a resource handling controller coupled to a processor and a memory. The resource handling controller is configured to: determine that a core network redirection for the UE device using CIoT optimizations is required; and to page the UE if the UE is in an IDLE mode and reject a service request with an EMM or a 5GMM cause #31.

In embodiments, a UE for handling a resource in a wireless network includes a resource handling controller coupled to a processor and a memory. The resource handling controller is configured to detect a change in preference of the UE to use CIoT optimization and indicate the change in preference of the UE to a network entity through a registration procedure.

In embodiments, a UE for handling a resource in a wireless network includes a resource handling controller coupled to a processor and a memory. The resource handling controller is configured to detect a change in preference of the UE to use CIoT optimization and wait a signaling trigger at the UE detect when the UE is in an IDLE mode, where the signaling trigger is initiated before a registration procedure. The resource handling controller is configured to indicate the change in preference of the UE to a network entity through the registration procedure.

In embodiments, a UE for handling a resource in a wireless network includes a resource handling controller coupled to a processor and a memory. The resource handling controller is configured to receive a reject cause #31 from a network entity. The UE does not find a suitable cell in a redirected radio access technology (RAT). Further, the resource handling controller detects at least one CIoT configuration change, stops a timer, and proceeds with at least one action.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 8 is an example sequence diagram illustrating various operations for enabling the NAS procedures in the UE during an enhanced handling for CPSR and TAU collision, according to embodiments disclosed herein;

DETAILED DESCRIPTION

Figure 1:
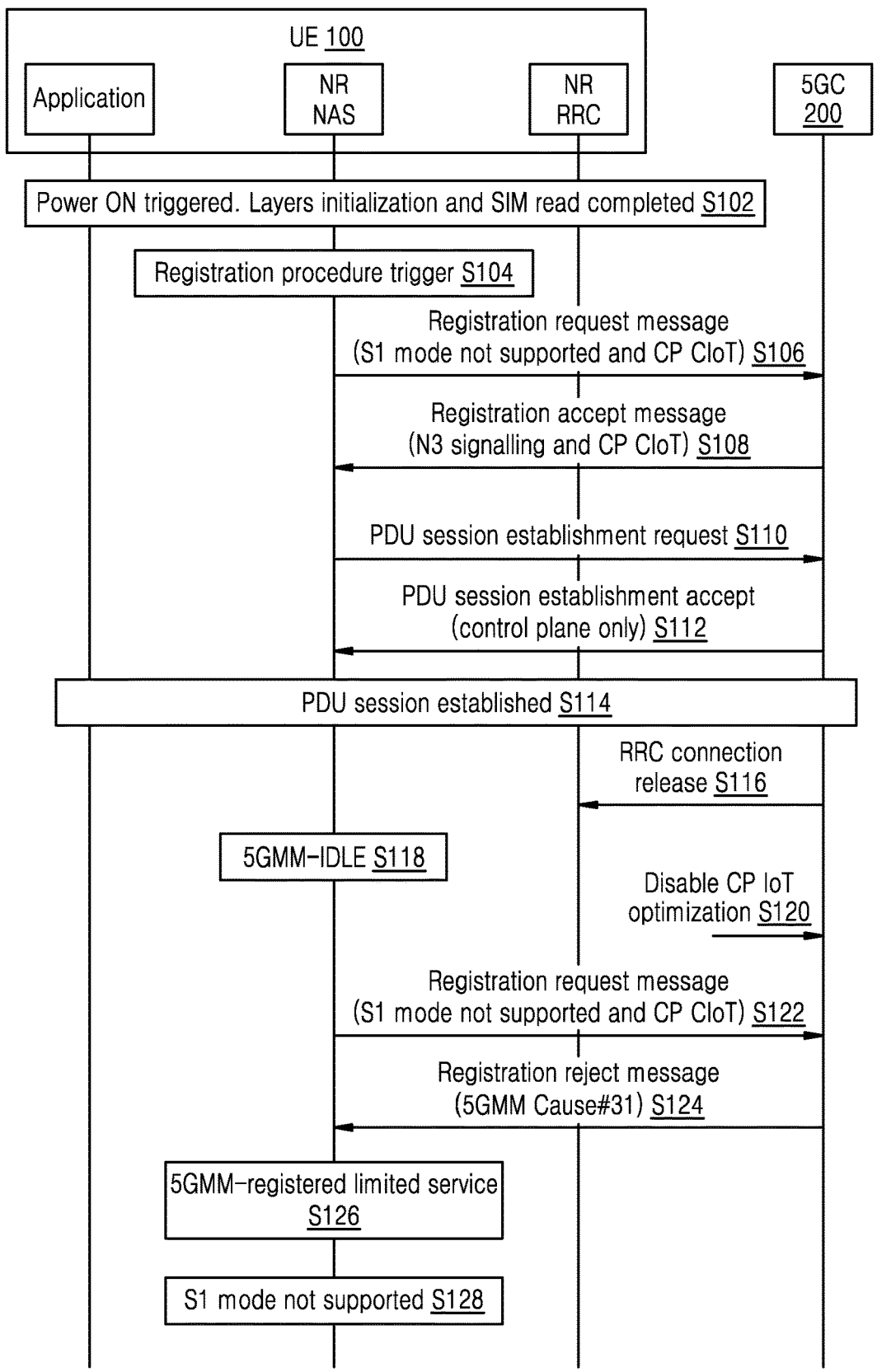
FIG. 1, FIG. 2, FIG. 3A, FIG. 3B, FIG. 4, FIG. 5 and FIG. 6 depict various problem scenarios while enabling NAS procedures in a UE, according to prior art methods.
Figure 2:
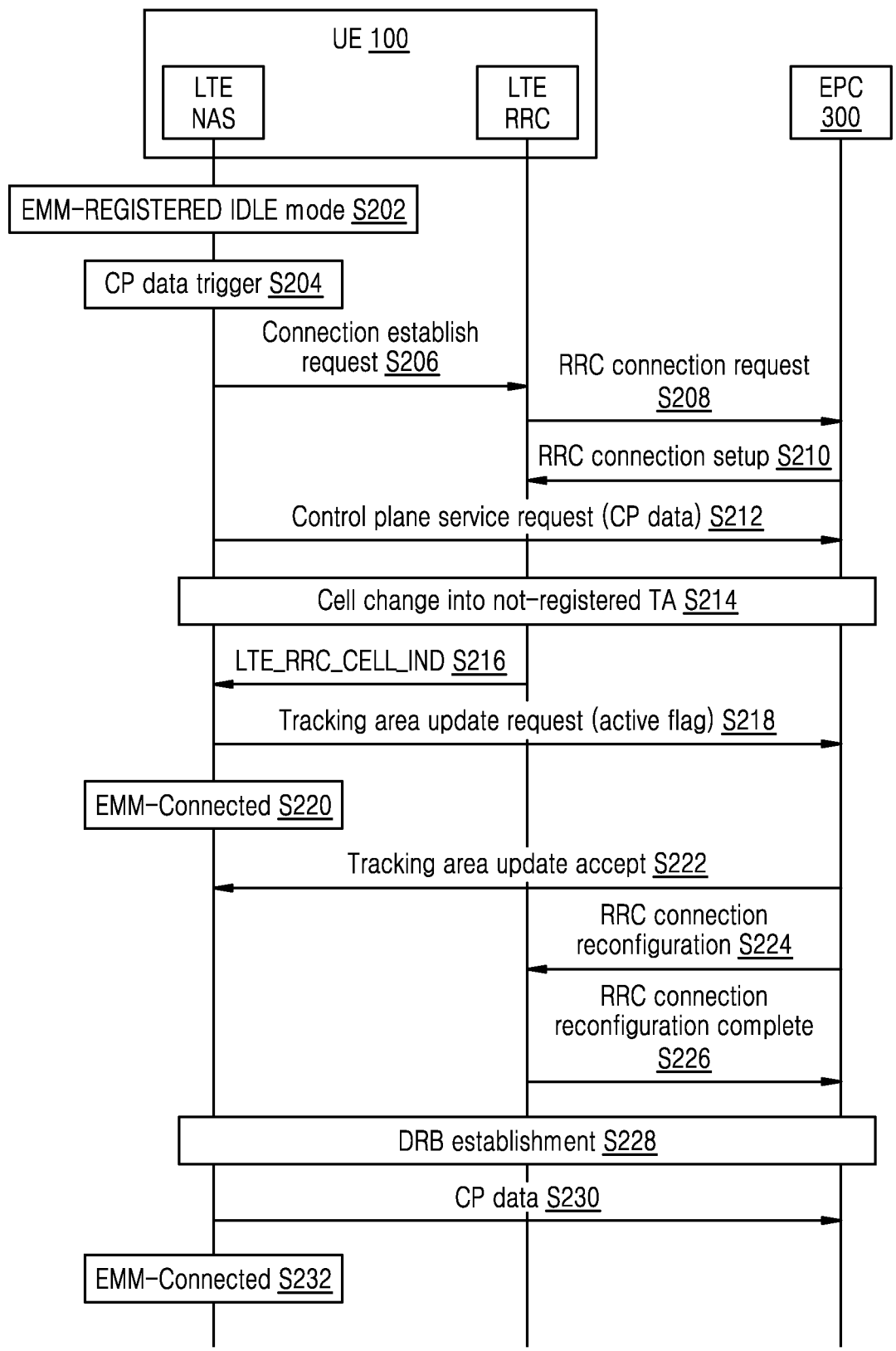
Figure 3A:
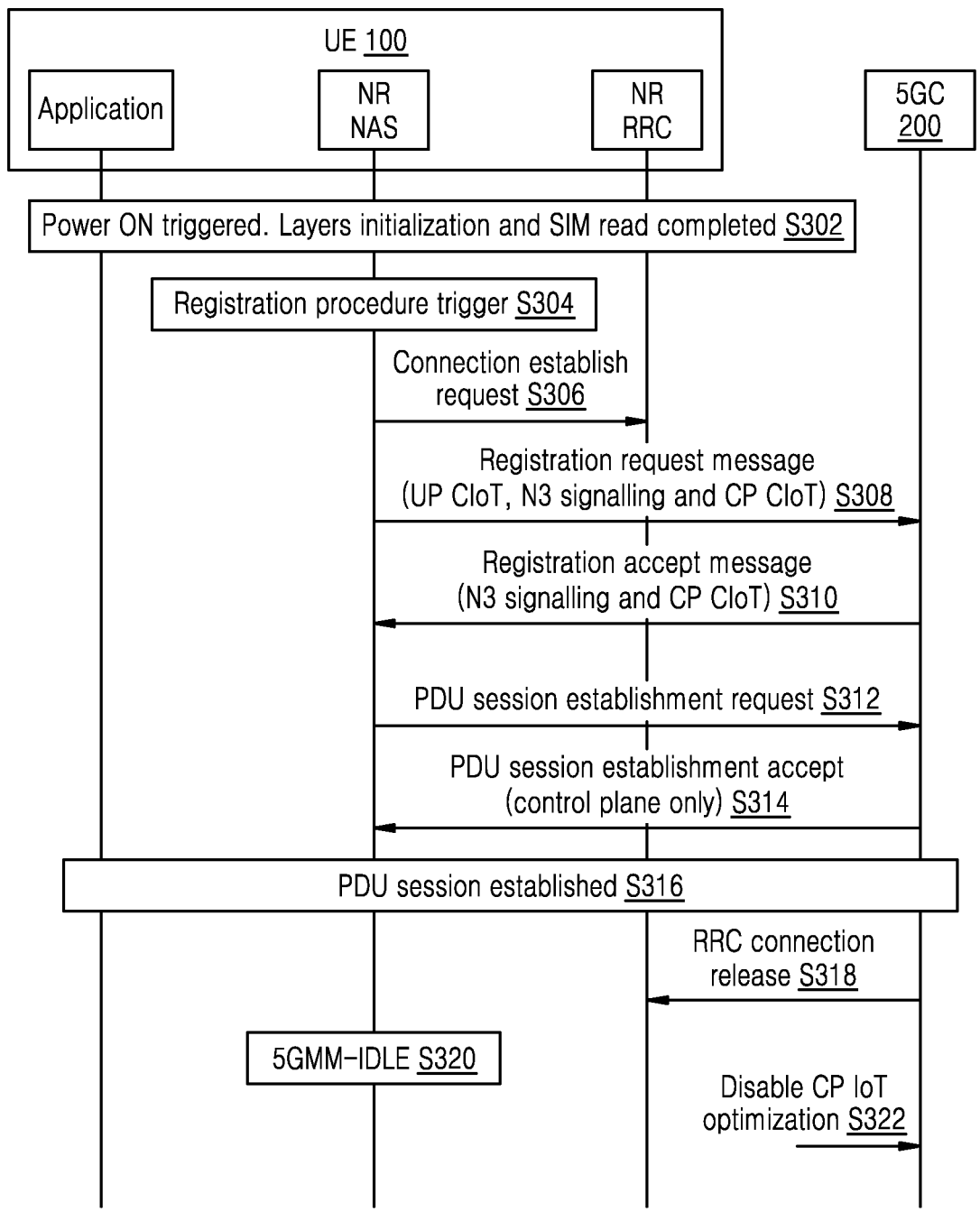
Figure 3B:
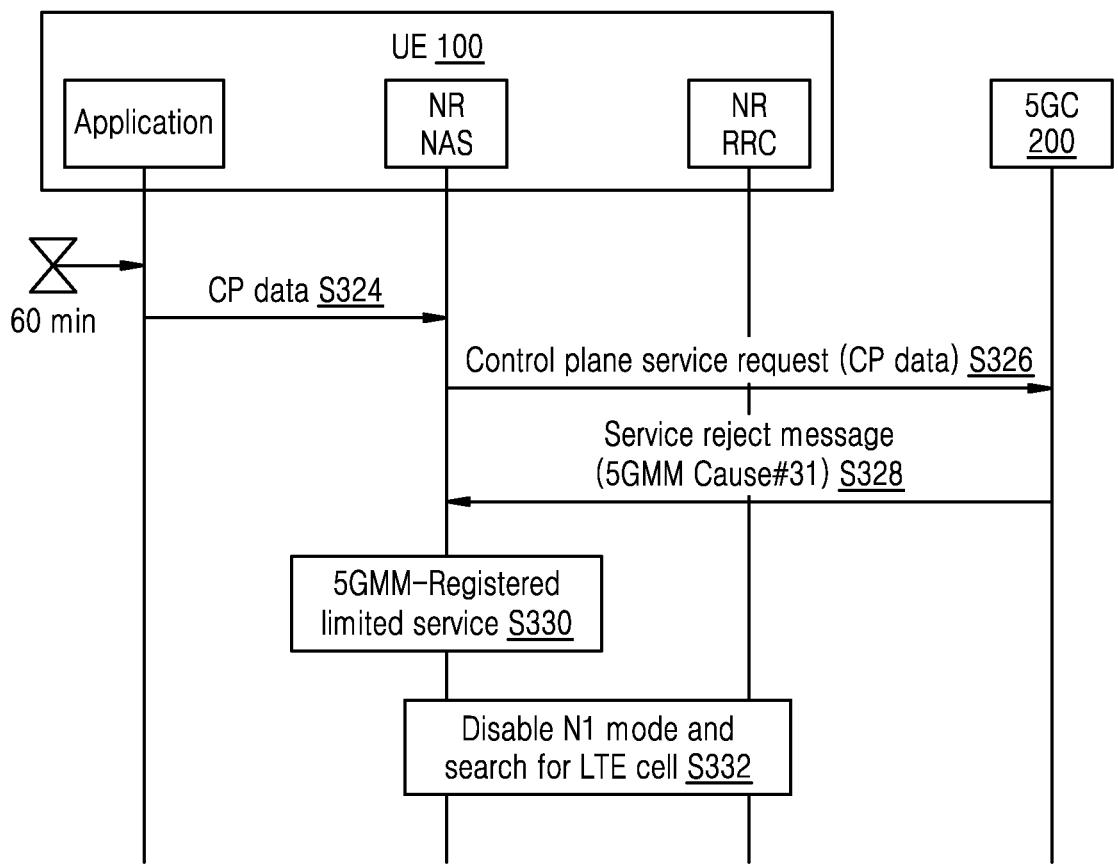
Figure 4:
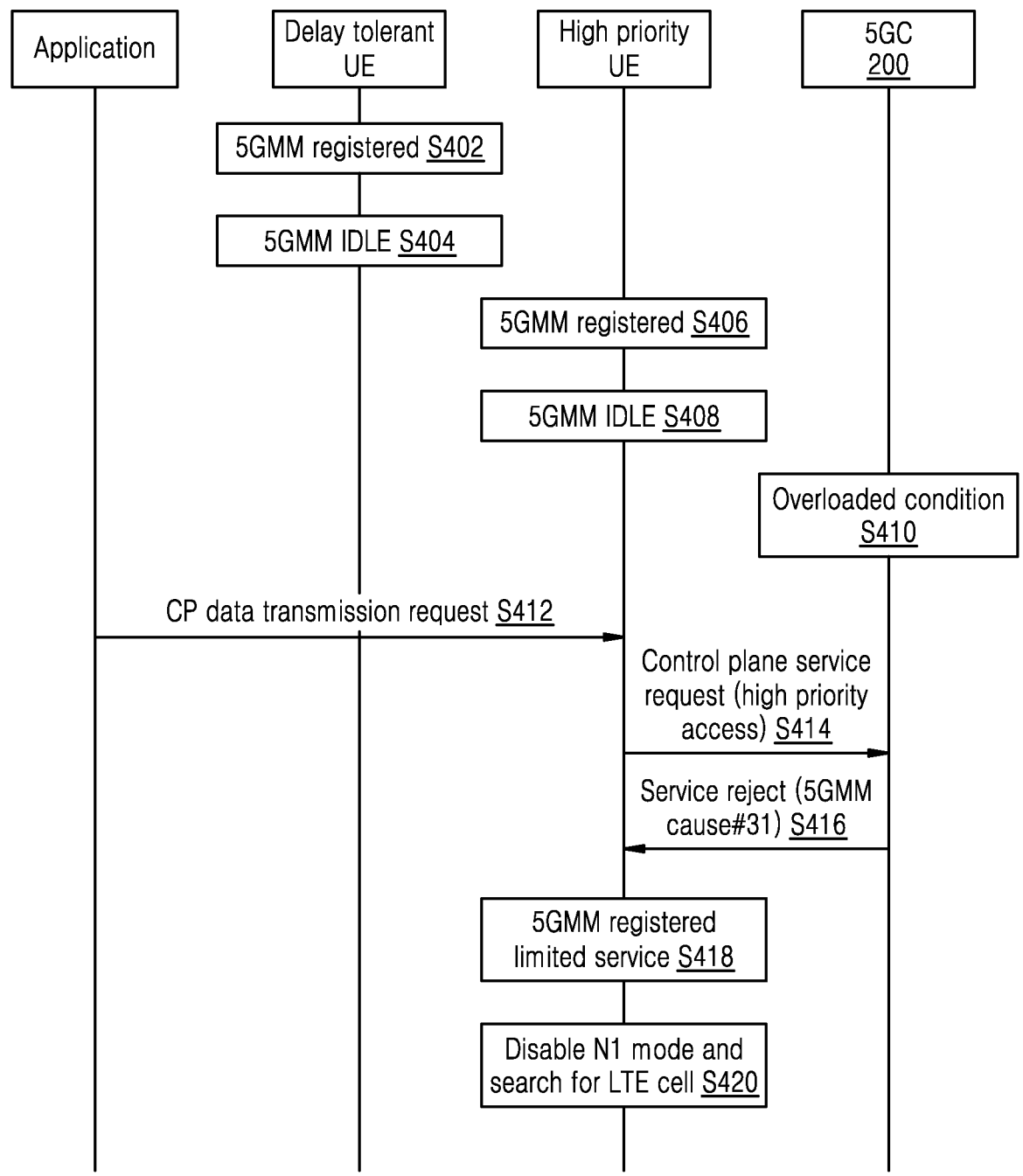
Figure 5:
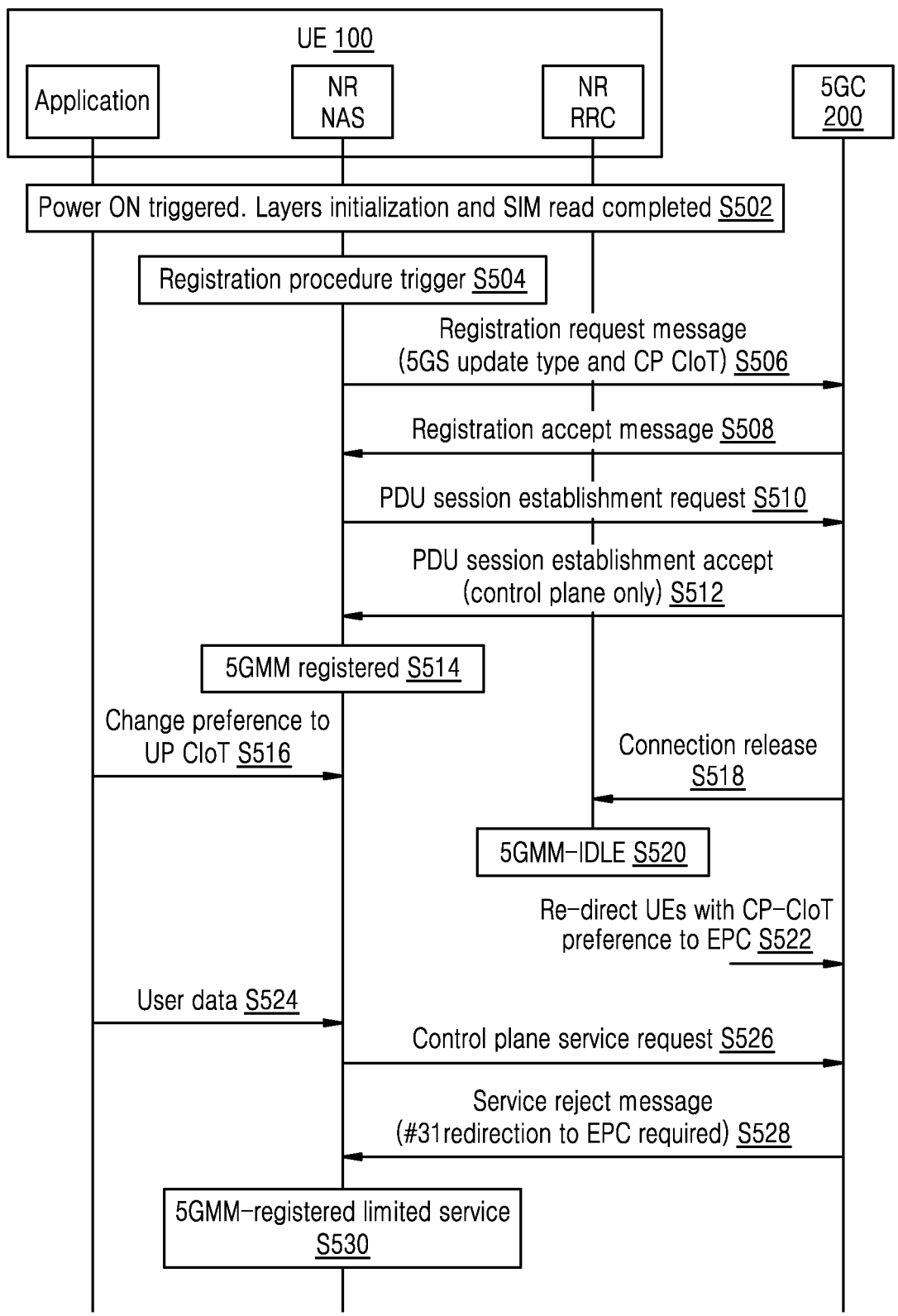
Figure 6:
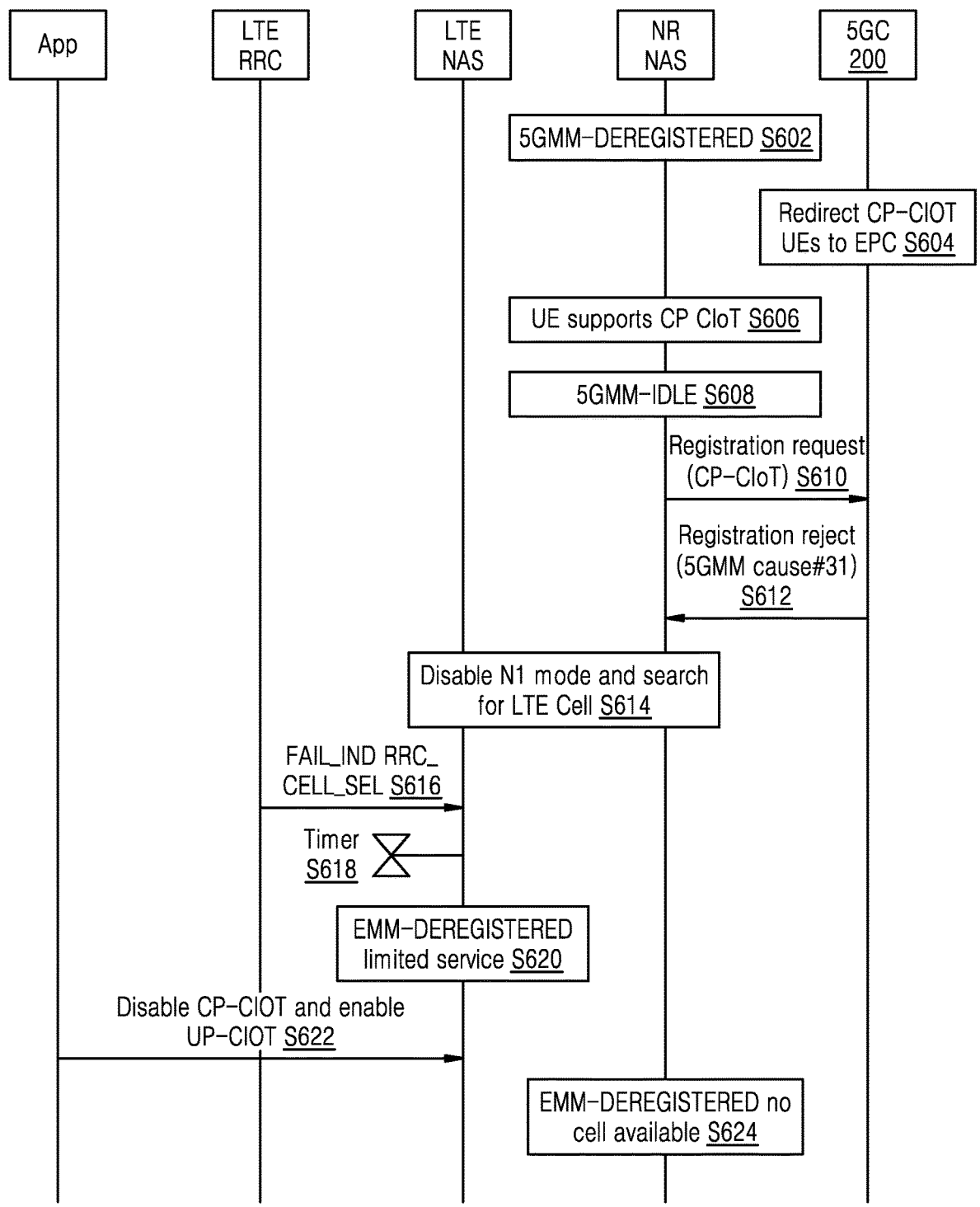

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments of methods herein may be used for enabling enhanced NAS procedure in CIoT devices. The methods may be used to indicate the change in support of CP/UP preference when both CP and UP CIOT optimization are supported, so as to reduce the signalling overhead in the wireless network, and improve the UE behavior and NAS procedural efficiencies.

Referring now to the drawings, and more particularly to FIGS. 7A through 21, where similar reference characters denote corresponding features consistently throughout the figures, at least one embodiment is illustrated.

Figure 7A:
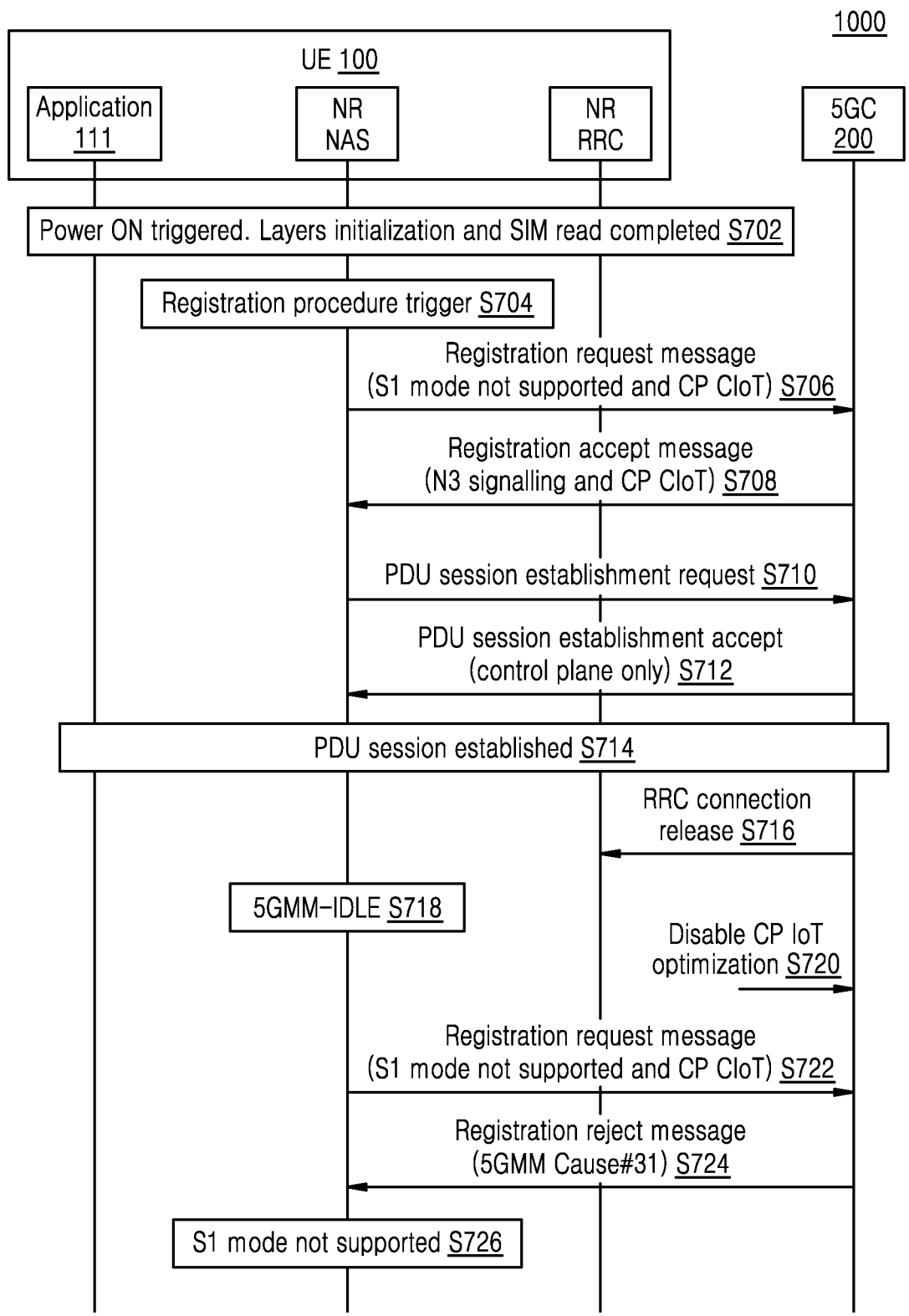
FIGS. 7A and 7B together show an example sequence diagram illustrating various operations for enabling the NAS procedures in the UE while receiving #31 as an abnormal case if a redirected RAT is not supported in the UE, according to embodiments disclosed herein.
Figure 7B:
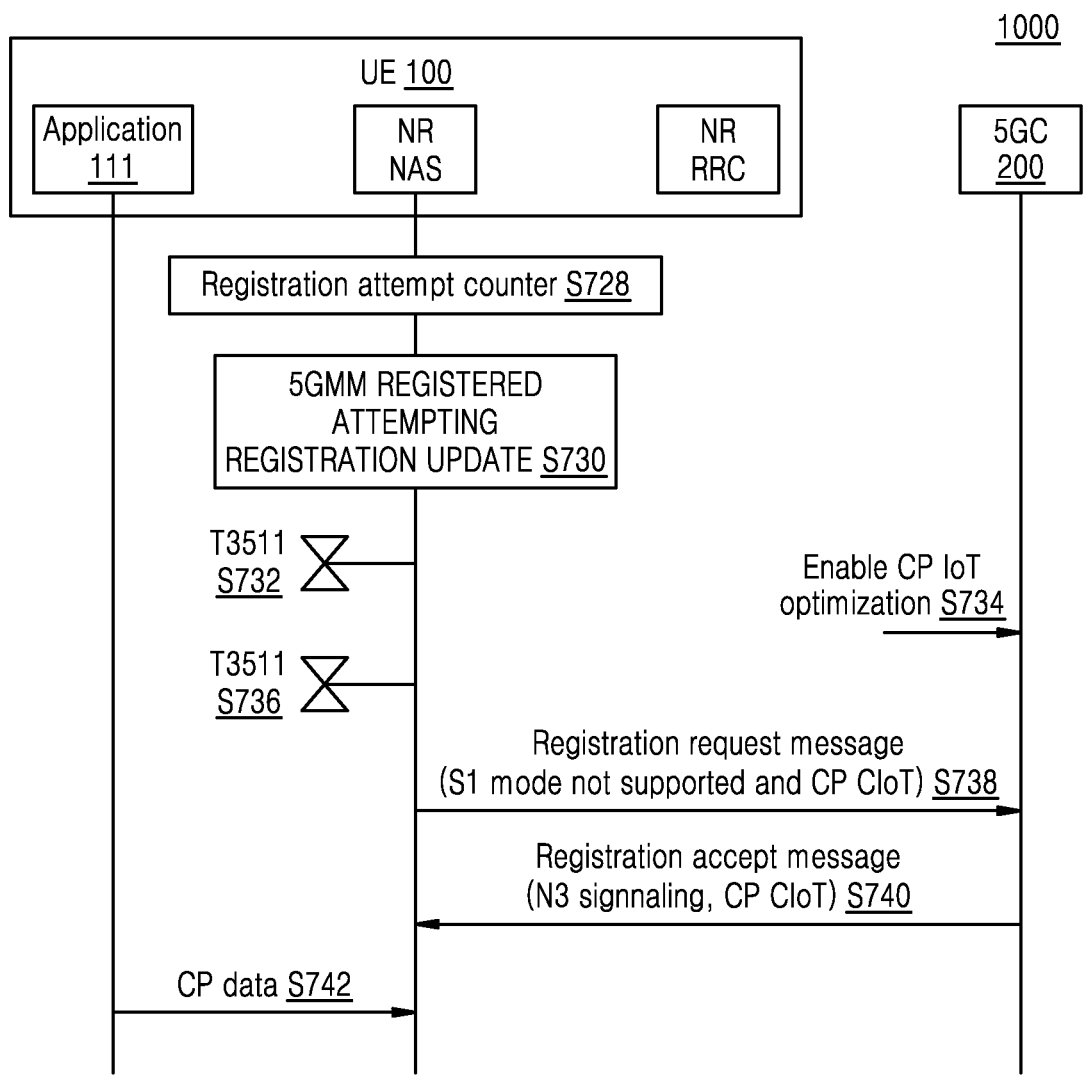

FIGS. 7A and 7B together show an example sequence diagram illustrating various operations of a method for enabling NAS procedures in a UE 100 while receiving reject cause #31 as an abnormal case if the redirected RAT is not supported in the UE 100, according to embodiments of the inventive concept. Based on the method, abnormal case actions for the ongoing procedure can be taken if reject cause #31 is received when the UE 100 does not support the redirected RAT. To this end, the following actions may be taken at the UE 100:

For a UE in N1 mode
1. #31 received during Registration procedure for initial registration, the UE 100 enters 5GMM REGISTERED. ATTEMPTING-REGISTRATION state and attempt counter actions are taken.
2. #31 received during Registration procedure for mobility and periodic registration, the UE 100enters 5GMM REGISTERED.ATTEMPTING-REGISTRATION-UPDATE state or 5GMM REGISTERED.NORMAL-SERVICE state and attempt counter actions are taken.
3. #31 received during Service Request procedure, the UE 100enters 5GMM REGISTERED.NORMAL-SERVICE state and locally releases the allocated resources For a UE in S1 mode
1. #31 received during Attach procedure, the UE 100 enters EMM DEREGISTERED.ATTEMPTING-TO-ATTACH state and attempt counter actions are taken.
2. #31 received during TAU procedure, the UE 100 enters EMM REGISTERED.ATTEMPTING-TO-UPDATE or EMM REGISTERED.NORMAL-SERVICE state and attempt counter actions are taken.
3. #31 received during Service Request procedure, the UE 100 enters EMM REGISTERED.NORMAL-SERVICE state and locally releases the allocated resource Referring to FIGS. 7A and 7B, at S702, in the UE 100, power ON triggered, layers initialization is done and SIM read completed. At S704, the NR NAS triggers the registration procedure. At S706, the NR NAS sends the REGISTRATION REQUEST message including the S1 mode not supported and CP CIoT to the 5GC 200. At S708, the 5GC 200 sends the REGISTRATION ACCEPT message including the N3 signalling and CP CIoT to the NR NAS based on the REGISTRATION REQUEST message. At S710, the NR NAS sends the PDU SESSION ESTABLISHMENT REQUEST to the 5GC 200. At S712, the 5GC 200 sends the PDU SESSION ESTABLISHMENT ACCEPT (control plane only) to the NR NAS. At S714, a PDU session is established between the UE 100 and the 5GC 200. At S716, the 5GC 200 sends the RRC connection release to the NR RRC. At S718, the NR NAS moves into the 5GMM-IDLE mode. At S720, the 5GC 200 disables the CP CIoT optimization. At S722, the NR NAS sends the REGISTRATION REQUEST message (including the S1 mode not supported and CP CIoT) to the 5GC 200. At S724, the 5GC 200 sends the REGISTRATION REJECT message (including the 5GMM Cause #31) to the NR NAS based on the REGISTRATION REQUEST message.

As shown in FIG. 7B, at S728, the NR NAS starts the registration attempt counter as S1 mode is not supported (at S726). At S730, the NR NAS enters the 5GMM REGISTERED ATTEMPTING REGISTRATION UPDATE state. At S732, T3511 timer starts at the NR NAS. At S734, the 5GC 200 enables the CP IoT optimization. At S736, T3511 timer expired at the NR NAS. At S738, the NR NAS sends the REGISTRATION REQUEST message (including the S1 mode not supported and CP CIoT) to the 5GC 200. At S740, the 5GC 200 sends the REGISTRATION ACCEPT message (including the N3 signaling and the CP CIoT) to the NR NAS. At S742, an application 111 running within the UE 100 sends the CP data to the NR NAS.

FIG. 8 is an example sequence diagram illustrating various operations of a method for enabling the NAS procedures in the UE during an enhanced handling for CPSR and TAU collision, according to embodiments disclosed herein.

As shown in FIG. 8, at S802, the LTE NAS is in the EMM-REGISTERED IDLE mode. At S804, the LTE NAS triggers the CP data. At S806, the LTE NAS sends the connection establish request to the LTE RRC. At S808, the LTE RRC sends a RRC connection request to the EPC 300. At S810, the EPC 300 sends a RRC connection setup to the LTE RRC. At S812, the LTE NAS sends a CPSR (including the CP data) to the EPC 300. At S814, the UE 100 determines that the cell change into not-registered TA. At S816, the LTE RRC sends an LTE_RRC_CELL_IND to the LTE NAS. At S818, the LTE NAS sends the TRACKING AREA UPDATE REQUEST (including the signaling active flag) to the EPC 300. At S820, the LET NAS moves into the EMM-CONNECTED mode. At S822, the EPC 300 sends the TRACKING AREA UPDATE ACCEPT to the LTE NAS. At S824, the LTE NAS sends the CP data to the EPC 300.

The method of FIG. 8 can be used to remove the mandatory requirement of setting the active flag in the TAU REQUEST when TAU procedure is triggered during an ongoing service request procedure. Instead, the signalling active flag or the active flag can be encoded based on the cause of ongoing service request procedure and the UE's support. Thus, for a UE using CP-CIoT optimizations, if the ongoing CPSR is initiated due to the pending CP data, pending signalling or initiated in response to paging and TAU procedure is triggered, the signalling active flag shall be set in the TRACKING AREA UPDATE REQUEST message. The signalling active flag may be or is always set in the TRACKING AREA UPDATE REQUEST message. This ensures that the NAS signaling Connection is retained after TAU procedure and the user plane does not become established.

Figure 9A:
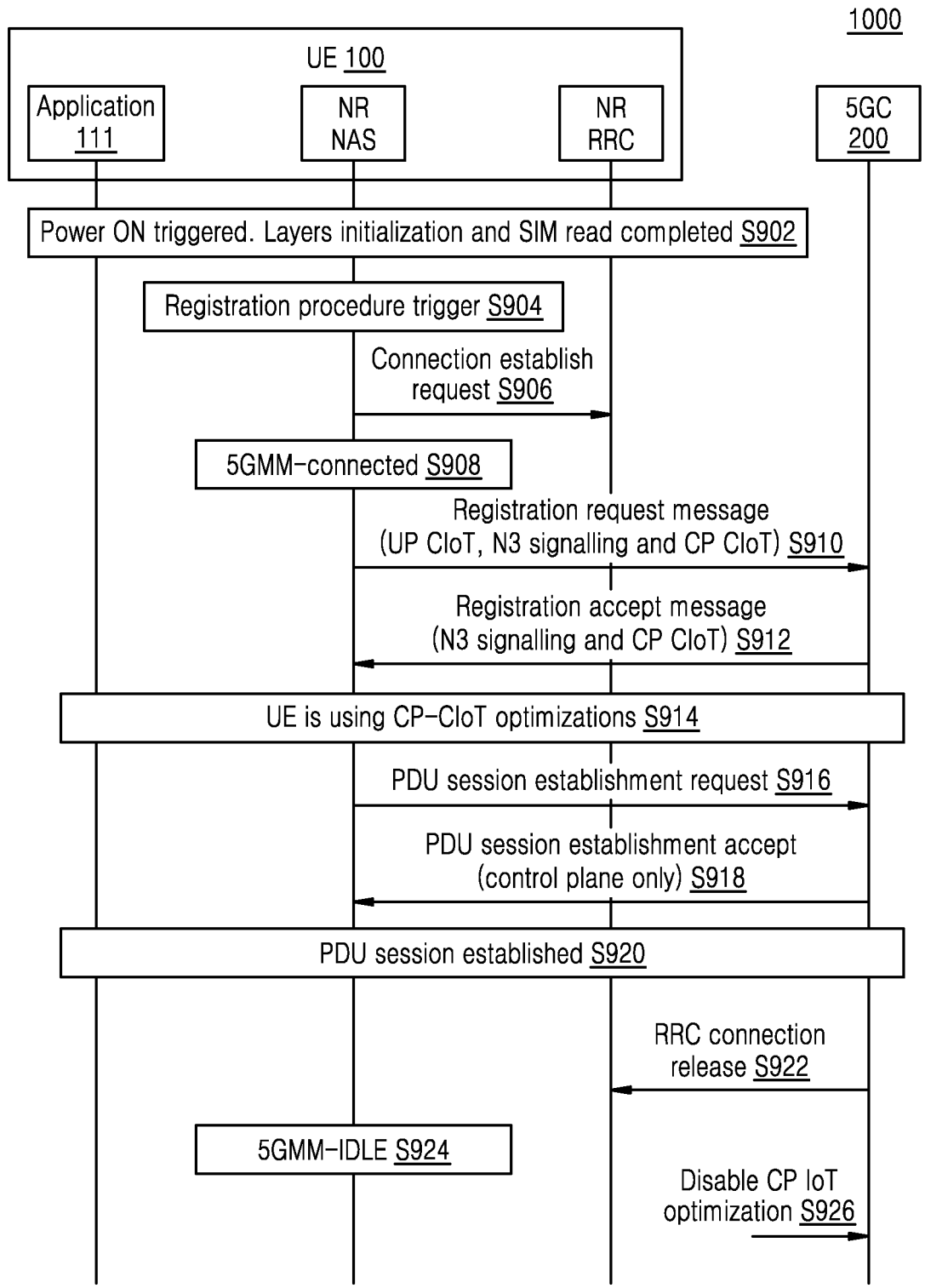
FIG. 9A and FIG. 9B are example sequence diagrams illustrating various operations for enabling the NAS procedures in the UE during redirecting CIOT UEs in an IDLE mode, according to embodiments disclosed herein.
Figure 9B:
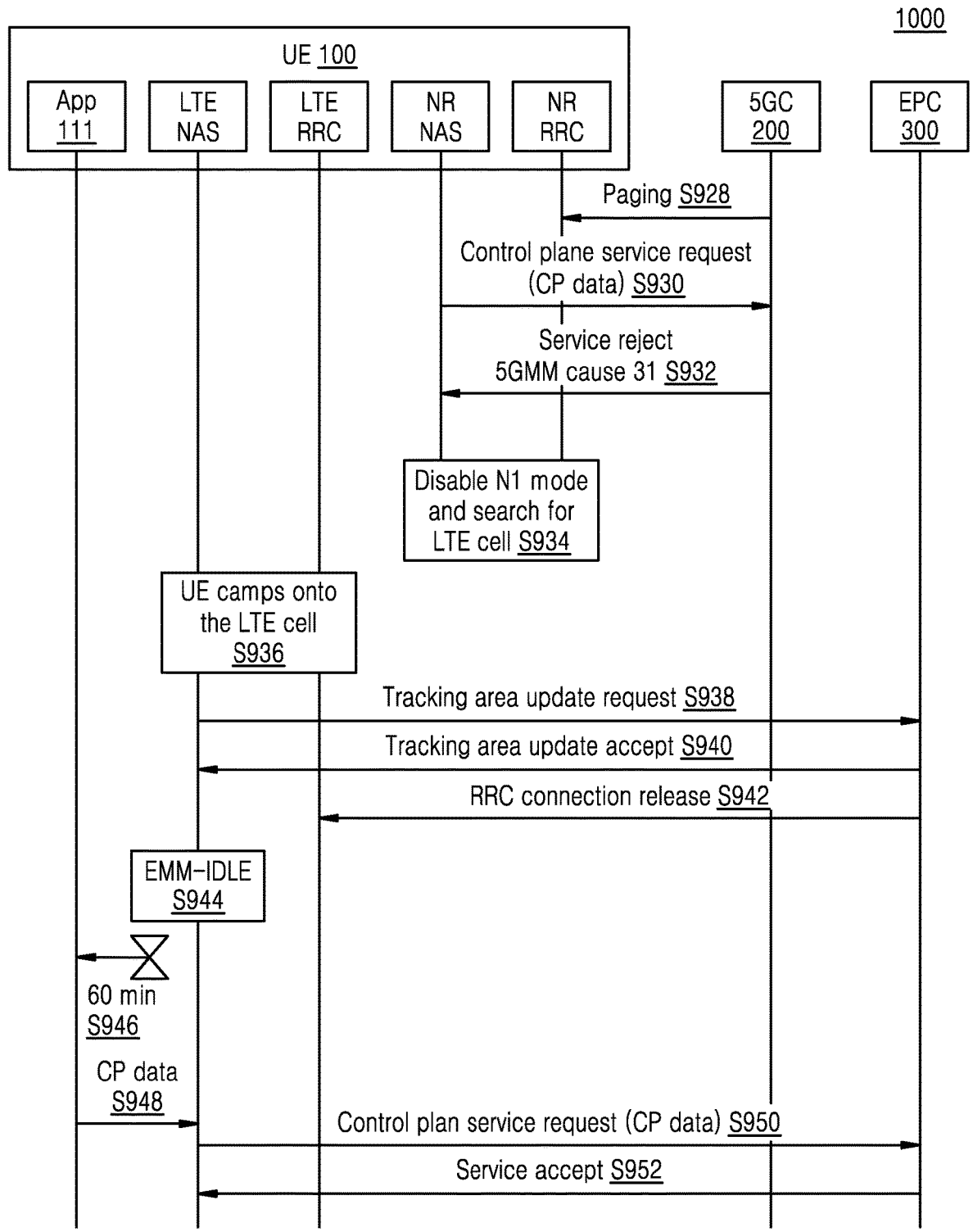

FIG. 9A and FIG. 9B are example sequence diagrams illustrating various operations of a method for enabling the NAS procedures in the UE during redirecting CIOT UEs in IDLE mode, according to embodiments disclosed herein. The method can be used to enable the network to convey the updated information to all the UEs, including the ones in IDLE mode (e.g., at a higher priority). Thus, if the network has to redirect the CIoT UEs to another supported RAT, the network can page the UEs in IDLE mode and send the reject cause #31 in the subsequent Service Request procedure. Note that the method may be used for both LTE and NR UEs.

As shown in FIGS. 9A and 9B, at S902, in the UE 100, power ON triggered, layers initialization are done and SIM read is completed. At S904, the NR NAS triggers the registration procedure. At S906, the NR NAS sends the connection establish request to the NR RRC. At S908, the NR NAS is in a 5GMM-CONNECTED mode. At S910, the NR NAS sends the REGISTRATION REQUEST message (including the UP CIoT, N3 signalling and CP CIoT) to the 5GC 200. At S912, the 5GC 200 sends the REGISTRATION ACCEPT message (including the N3 signalling and CP CIoT) to the NR NAS. At S914, the UE is configured to use CP-CIoT optimizations.

At S916, the NR NAS sends the PDU SESSION ESTABLISHMENT REQUEST to the 5GC 200. At S918, the 5GC 200 sends the PDU SESSION ESTABLISHMENT ACCEPT (including the control plane only) to the NR NAS.

At S920, the PDU session is established between the UE 100 and the 5GC 200. At S922, the 5GC 200 sends the RRC connection release to the NR RRC. At S924, the NR NAS is in the 5GMM-IDLE mode. At S926, the 5GC 200 disables the CP IoT optimization. At S928, the 5GC 200 sends the paging to the NR RRC. At S930, the NR NAS sends the CONTROL PLANE SERVICE REQUEST (including the CP data) to the 5GC 200. At S932, the 5GC 200 sends the SERVICE REJECT message (including the 5GMM Cause #31) to the NR NAS. At S934, the UE 100 disables the N1 mode and searches for LTE cell.

At S936, the UE 100 camps on the LTE cell. At S938, the LTE NAS sends the TRACKING AREA UPDATE REQUEST to the EPC 300. At S940, the EPC 300 sends the TRACKING AREA UPDATE ACCEPT to the LTE NAS. At S942, the EPC 300 sends the RRC connection release to the LTE RRC. At S944, the LTE NAS is in the EMM-IDLE mode. At S946, the timer is running in an application 111 running within UE 100. At S948, the application 111 sends the CP data to the LTE NAS. At S950, the LTE NAS sends the CONTROL PLAN SERVICE REQUEST (including the CP data) to the EPC 300. At S952, the EPC 300 sends the SERVICE ACCEPT to the LTE NAS.

Figure 10:
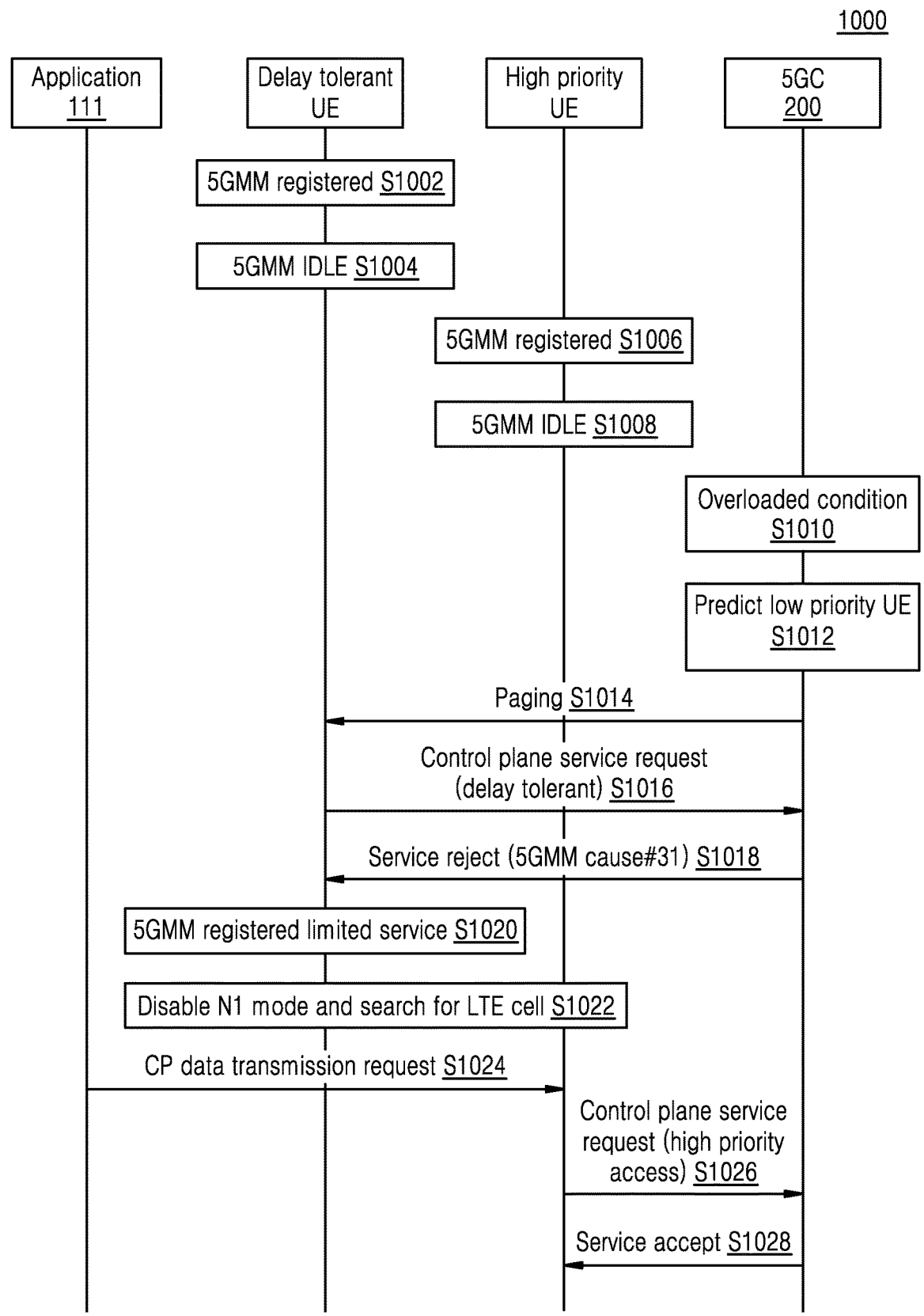
FIG. 10 is an example sequence diagram illustrating various operations for enabling the NAS procedures in the UE based on a priority condition, according to embodiments disclosed herein.

FIG. 10 is an example sequence diagram illustrating various operations for enabling the NAS procedures in the UE based on a priority condition, according to embodiments disclosed herein.

As shown in FIG. 10, at S1002, a delay tolerant UE 100' is in a 5GMM REGISTERED state. At S1004, the delay tolerant UE 100' is in the 5GMM IDLE mode. At S1006, a high priority UE 100" is in a 5GMM REGISTERED mode. At S1008, the high priority UE 100" is in the 5GMM IDLE mode. At S1010, the 5GC 200 detects an overloaded condition. At S1012, the 5GC 200 predicts the low priority UE. At S1014, the 5GC 200 sends the paging to the delay tolerant UE.

At S1016, the delay tolerant UE 100' sends the CONTROL PLANE SERVICE REQUEST (including the delay tolerant) to the 5GC 200. At S1018, the 5GC 200 sends the SERVICE REJECT (including the 5GMM cause #31) to the delay tolerant UE 100' based on the CONTROL PLANE SERVICE REQUEST. Based on the SERVICE REJECT, at S1020, the delay tolerant UE is in a 5GMM REGISTERED LIMITED SERVICE. At S1022, the delay tolerant UE 100' disables an N1 mode and searches for an LTE cell. At S1024, an application 111 sends the CP data transmission request to the high priority UE 100". At S1026, the high priority UE 100" sends the CONTROL PLANE SERVICE REQUEST (including the high priority access) to the 5GC 200. At S1028, the 5GC 200 sends the SERVICE ACCEPT to the high priority UE.

Figure 11:
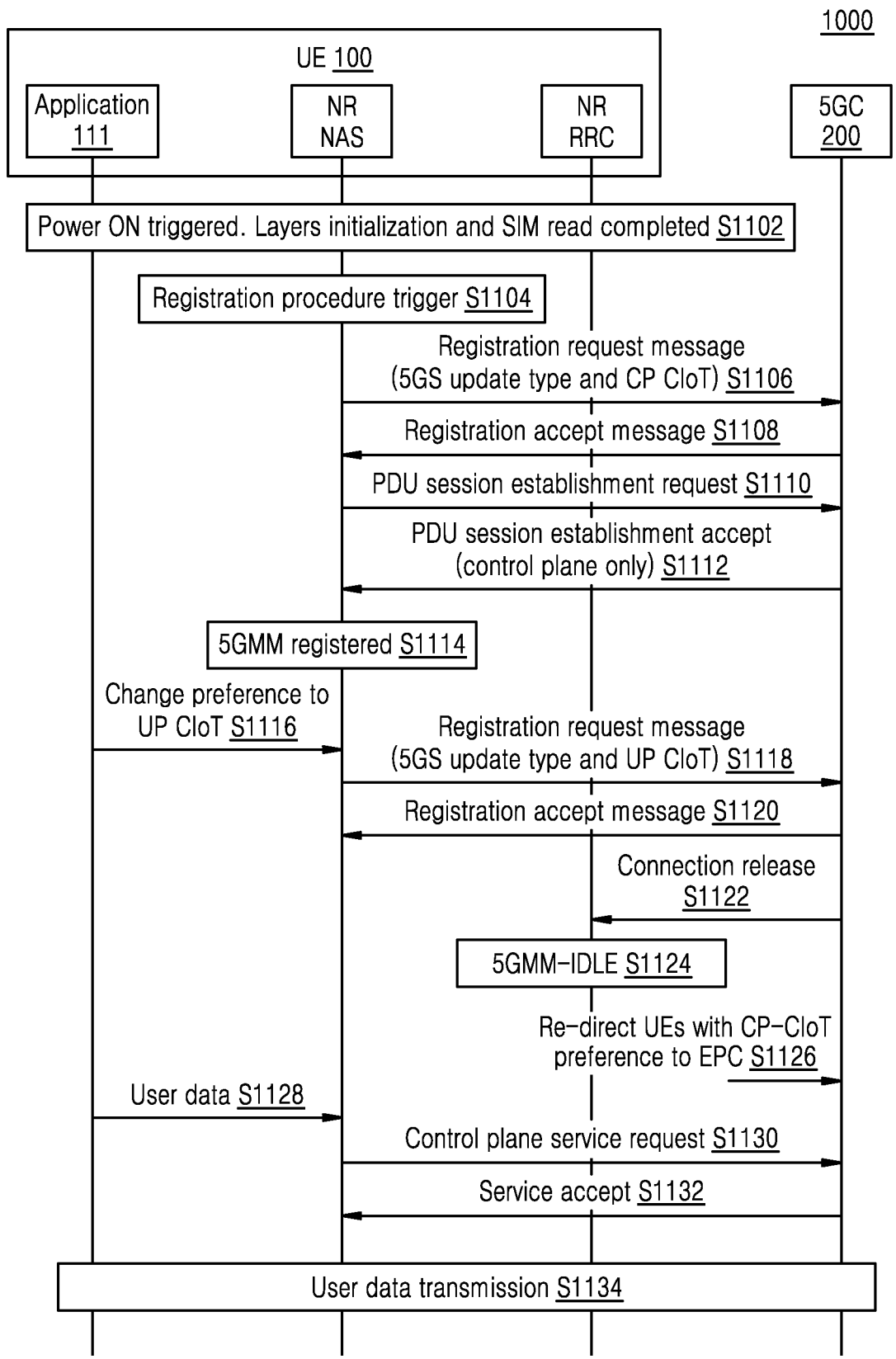
FIG. 11 is an example sequence diagram illustrating various operations for enabling the NAS procedures in the UE while indicating change in CIoT preference, according to embodiments disclosed herein.

FIG. 11 is an example sequence diagram illustrating various operations for enabling the NAS procedures in the UE while indicating change in CIoT preference, according to embodiments disclosed herein.

The method can be used to trigger the registration procedure when there is a change in the UE's preference to use CIoT optimizations. For the UE 100 in N1 mode, the registration procedure for mobility and periodic registration is be triggered when there is a change in UE's preference to use Control Plane or User Plane CIoT optimizations (as shown in FIG. 11). The REGISTRATION REQUEST with the updated 5GS update type IE indicating the UE's preference in both EPS and 5GS is sent to the network (as shown in FIG. 12).

As shown in FIG. 11, at S1102, in the UE 100, power ON triggered, layers initialization is done and SIM read completed. At S1104, the NR NAS triggers the registration procedure. At S1106, the NR NAS sends the REGISTRATION REQUEST message including the 5GS update type and the CP CIoT to the 5GC 200. At S1108, the 5GC 200 sends the REGISTRATION ACCEPT message to the NR NAS based on the REGISTRATION REQUEST message. At S1110, the NR NAS sends the PDU SESSION ESTABLISHMENT REQUEST to the 5GC 200. At S1112, the 5GC 200 sends the PDU SESSION ESTABLISHMENT ACCEPT (control plane only) to the NR NAS based on the PDU SESSION ESTABLISHMENT REQUEST. At S1114, the NR NAS is in the 5GMM REGISTERED mode. At S1116, the application sends the change preference to UP CIoT to the NR NAS.

At S1118, the NR NAS sends the REGISTRATION REQUEST message (including the 5GS update type and the UP CIoT) to the 5GC 200. At S1120, the 5GC 200 sends the REGISTRATION ACCEPT message to the NR NAS. At S1122, the 5GC 200 sends the RRC connection release to the NR RRC. At S1124, the NR RRC moves into the 5GMM-IDLE mode. At S11226, the 5GC 200 re-directs the UEs with CP-CIoT preference to the EPC 300. At S1128, the application sends the user data to the NR NAS. At S1130, the NR NAS sends the CONTROL PLANE SERVICE REQUEST to the 5GC 200. At S1132, the 5GC 200 sends the SERVICE ACCEPT message to the NR NAS based on the CONTROL PLANE SERVICE REQUEST.

Figure 12:
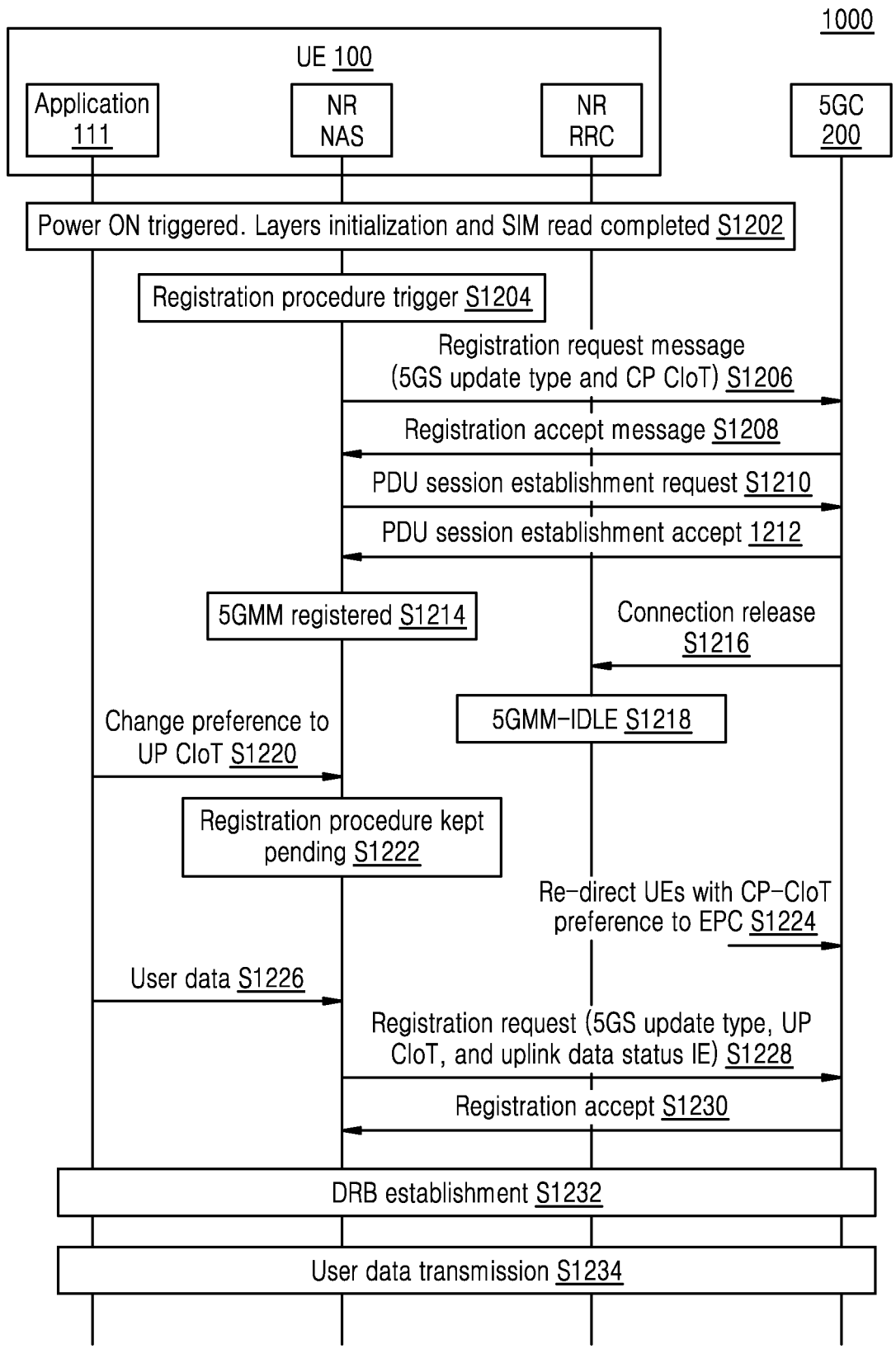
FIG. 12 is an example sequence diagram illustrating various operations for enabling the NAS procedures in the UE while indicating change in CIoT configurations in delay tolerant devices (e.g., delay tolerant UE), according to embodiments disclosed herein.

FIG. 12 is an example sequence diagram illustrating various operations for enabling NAS procedures in the UE while indicating change in CIoT configurations in delay tolerant UE, according to an embodiment. Considering the power saving requirements of CIoT devices, the following additional solution may be enacted for a UE that is delay tolerant. When there is an update in the UE's CIoT configurations (support or preference) for a UE in IDLE mode, instead of immediately performing a registration procedure, it proposed that the UE can hold the registration procedure until there is a trigger from the UE or from the network: i.e., if there's pending data/signaling to be sent to the network (or) if the network sends Paging due to pending DL data/signaling. The UE can send the REGISTRATION REQUEST to the network with the updated 5GMM capability IE and 5GS update type IE instead of triggering a service request procedure. This ensures that the UE will avoid unnecessary wakeups and frequent signaling. Also, sending the Uplink data status IE and Follow-on-request in the REGISTRATION REQUEST would make sure that the need for Service Request procedure would also get satisfied. The method is applicable to LTE devices as well. In case of LTE, a TAU REQUEST with updated UE network capability IE, EPS Update Type IE and Active/Signalling Active flag should be sent to the network.

As shown in FIG. 12, at S1202, in the UE 100, power ON triggered, layers initialization is done and SIM read completed. At S1204, the NR NAS triggers the registration procedure. At S1206, the NR NAS sends the REGISTRATION REQUEST message including the 5GS update type and the CP CIoT to the 5GC 200. At S1208, the 5GC 200 sends the REGISTRATION ACCEPT message to the NR NAS based on the REGISTRATION REQUEST message. At S1210, the NR NAS sends the PDU SESSION ESTABLISHMENT REQUEST to the 5GC 200. At S1212, the 5GC 200 sends the PDU SESSION ESTABLISHMENT ACCEPT (control plane only) to the NR NAS based on the PDU SESSION ESTABLISHMENT REQUEST. At S1214, the NR NAS is in the5GMM REGISTERED mode. At S1216, the 5GC 200 sends the RRC connection release to the NR RRC. At S1218, the NR RRC moves into the 5GMM-IDLE mode. At S1220, the application sends the change preference to UP CIoT to the NR NAS. At S1222, the registration procedure is kept pending at the NR NAS. At S1224, the 5GC 200 is configured to re-direct the UEs with CP-CIoT preference to the EPC 300.

At S1226, the application sends the user data to the NR NAS. At S1228, the NR NAS sends a REGISTRATION REQUEST message (including the 5GS update type, UP CIoT, and uplink data status IE) to the 5GC 200. At S1230, the 5GC 200 sends the REGISTRATION ACCEPT message to the NR NAS based on the REGISTRATION REQUEST message. At S1232, the DRB is established between the UE 100 and the 5GC 200. At S1234, the user data transmission is between the UE 100 and the 5GC 200.

Figure 13:
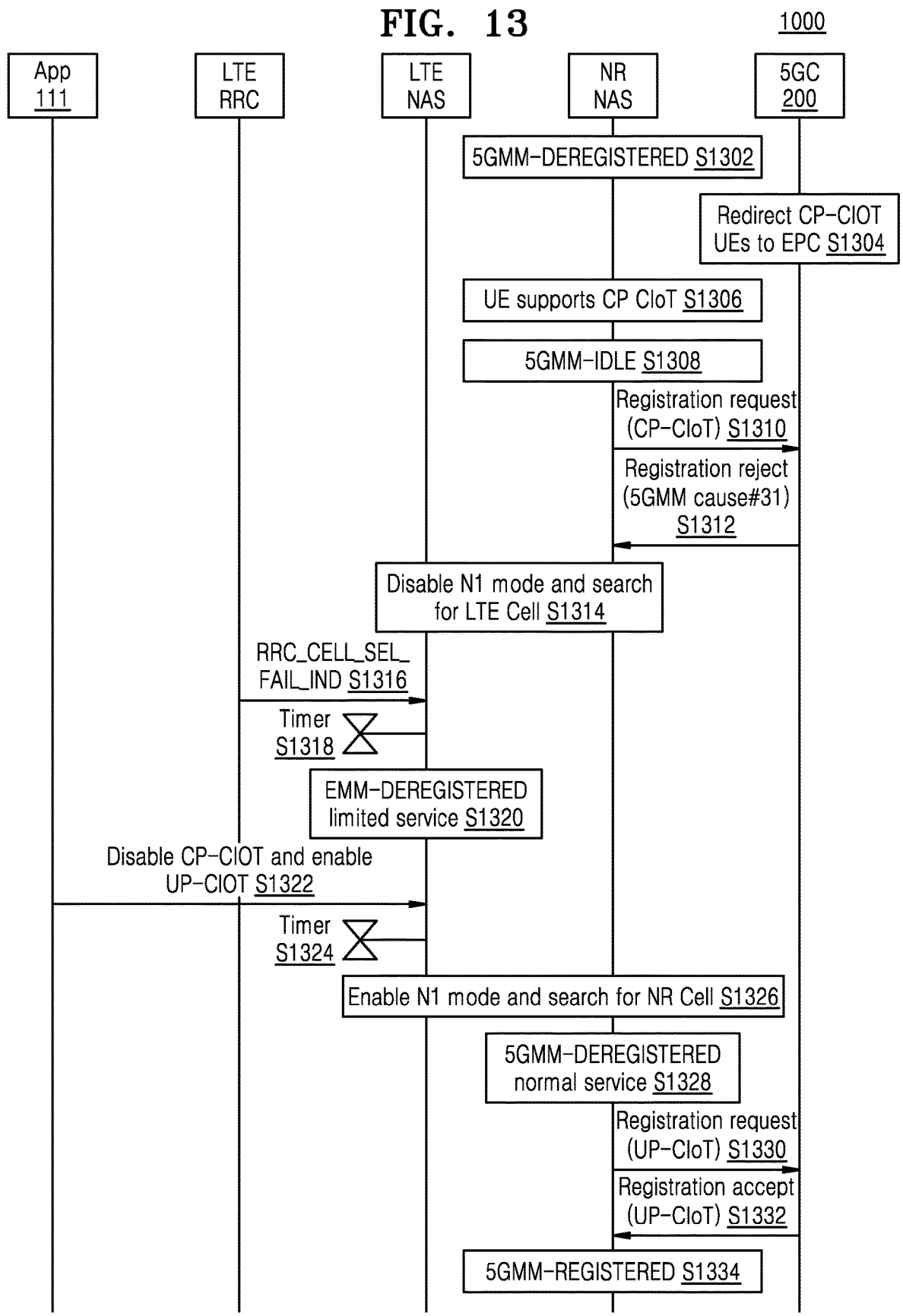
FIG. 13 is an example sequence diagram illustrating various operations for enabling the NAS procedures in the UE for re-enabling N1/S1 mode if the CIoT optimization configuration changes in the UE, according to embodiments disclosed herein.

FIG. 13 is an example sequence diagram illustrating various operations for enabling the NAS procedures in the UE for re-enabling N1/S1 mode if the CIoT optimization configuration changes in the UE, according to embodiments disclosed herein.

As shown in FIG. 13, at S1302, the NR NAS is in the 5GMM-DEREGISTERED mode. At S1304, the 5GC 200 redirects the CP-CIOT UEs to the EPC 300. At S1306, UE 100 supports the CP CIoT at the NR NAS. At S1308, the NR NAS is in the 5GMM-IDLE mode. At S1310, the NR NAS sends the REGISTRATION REQUEST (including the CP-CIoT) to the 5GC 200. Based on the REGISTRATION REQUEST, at S1312, the 5GC 200 sends the REGISTRATION REJECT (including the 5GMM cause #31) to the NR NAS. At S1314, the LTE NAS and NR NAS disable N1 mode and search for LTE Cell.

At S1316, the LTE RRC sends the RRC_CELL_SEL_FAIL_IND to the LTE NAS. At S1318, timer runs in the LTE NAS. At S1320, the LTE NAS is in the EMM-DEREGISTERED LIMITED SERVICE. At S1322, the application sends the request for disabling the CP-CIOT and enabling the UP-CIOT to the LTE NAS. At S1324, the timer running in the LTE NAS.

At S1326, the LTE NAS and NR NAS enable the N1 mode and search for the NR cell. At S1328, the NR NAS is in the 5GMM-DEREGISTERED NORMAL SERVICE. At S1330, the NR NAS sends the REGISTRATION REQUEST (including the UP-CIoT) to the 5GC 200. Based on the REGISTRATION REQUEST, at S1332, the 5GC 200 sends the REGISTRATION ACCEPT (including the UP-CIoT) to the NR NAS. At S1334, the NR NAS moves into the 5GMM-REGISTERED.

As shown in FIG. 13, if the UE 100 is unable to camp on the redirected RAT and has entered LIMITED SERVICE state and the UE's CIoT optimizations configuration has changed, one or more of the following operations may be initiated in the method: Stop the implementation-specific timer, Re-enable N1/S1 mode support which was disabled earlier, Camp on a cell of the previous RAT, and Proceed with the appropriate 5GMM/EMM procedure with the updated CIoT configurations. These operations are applicable to both UEs in N1 mode and S1 mode. The method ensures that the UE can avail normal services instead of waiting till the expiry of the timer and also provides a chance to avail services from the desired RAT.

Figure 14:
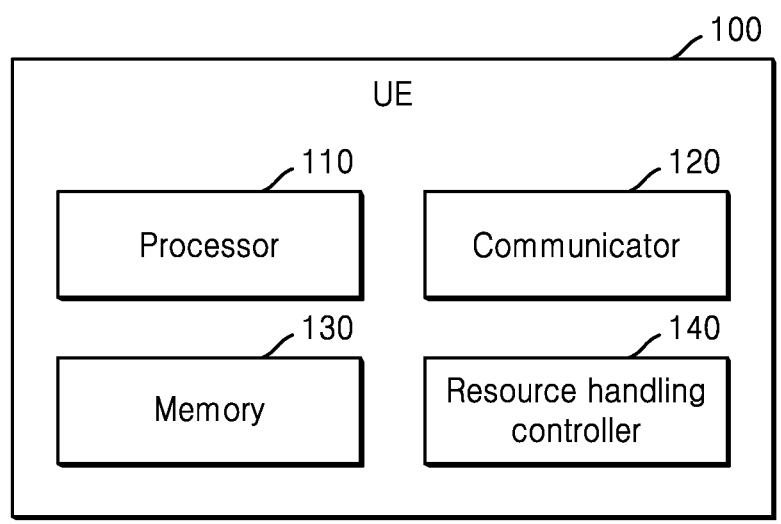
FIG. 14 shows various hardware components of the UE, according to embodiments disclosed herein.

FIG. 14 shows various hardware components of the UE 100, according to embodiments disclosed herein. In an embodiment, the UE 100 includes a processor 110, a communicator 120, a memory 130 and a resource handling controller 140. The processor 110 is coupled with the communicator 120, the memory 130 and the resource handling controller 140.

Figure 15:
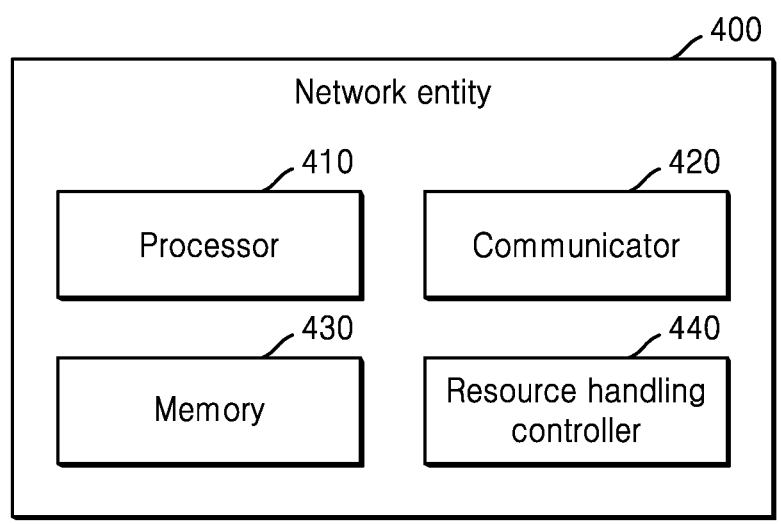
FIG. 15 shows various hardware components of a network entity, according to embodiments disclosed herein.

In an embodiment, the resource handling controller 140 receives the reject cause message from a network entity 400 (as shown in FIG. 15), where the resource handling controller 140 does not support the redirected RAT indicated in the reject cause message. In an embodiment, the reject cause message includes the reject cause #31, where the at least one action is performed based on the ongoing procedure of the UE 100. Further, the resource handling controller 140 considers the reject cause message as the abnormal case. Based on the abnormal case, the resource handling controller 140 performs at least one action.

In an embodiment, the at least one action includes at least one of the UE 100 entering a 5GMM REGISTERED-ATTEMPTING-REGISTRATION state and attempt counter actions are taken during a registration procedure for an initial registration, when the UE 100 is in a N1 mode, the UE 100 enters one of a 5GMM REGISTERED-ATTEMPTING-REGISTRATION-UPDATE state and a 5GMM REGISTERED-NORMAL-SERVICE state and attempt counter actions are taken during a registration procedure for mobility and periodic registration, when the UE 100 is in the N1 mode, and the UE 100 entering a 5GMM REGISTERED-NORMAL-SERVICE state and locally releases allocated resources during a service request procedure, when the UE 100 is in the N1 mode.

In an embodiment, the at least one action includes at least one of the UE 100 entering a EMM DEREGISTERED-ATTEMPTING-TO-ATTACH state and attempt counter actions are taken during an attach procedure, when the UE 100 is in a S1 mode, the UE 100 entering one of an EMM REGISTERED-ATTEMPTING-TO-UPDATE and an EMM REGISTERED-NORMAL-SERVICE state and attempt counter actions are taken during a TAU procedure, when the UE 100 is in the S1 mode, and the UE 100 entering an EMM REGISTERED-NORMAL-SERVICE state and locally releases the allocated resources during a service request procedure, when the UE 100 is in the S1 mode.

In another embodiment, the resource handling controller 140 detects the trigger of the TAU procedure due to configuration update or mobility when a control plane service request procedure (CPSR) is ongoing. Further, the resource handling controller 140 determines that at least one of pending CP data, pending signaling messages, and the paging procedure is ongoing. In response to detecting the trigger of the TAU procedure when the CPSR is ongoing and determining that at least one of the pending CP data, the pending signaling messages and the paging procedure is ongoing, the resource handling controller 140 sends the TAU REQUEST comprising the signaling active flag set.

In an embodiment, the resource handling controller 140 detects a change in preference of the UE 100 to use the CIoT optimization. The CIoT optimization may be a control plane CIoT optimization and/or a user plane CIoT optimization. Further, the resource handling controller 140 may indicate the change in preference of the UE 100 to the network entity 400 through the registration procedure.

In an embodiment, the resource handling controller 140 detects the change in preference of the UE 100 to use CIoT optimization. Further, the resource handling controller 140 waits for the signaling trigger, when the UE 100 is in the IDLE mode. The signaling trigger is initiated before a registration procedure. Further, the resource handling controller 140 indicates the change in preference of the UE 100 to the network entity 400 through the registration procedure.

In an embodiment, the resource handling controller 140 receives the reject cause #31 from the network entity 400, where the UE 100 does not find a suitable cell in the redirected radio access technology (RAT). Further, the resource handling controller 140 detects at least one CIoT configuration change and stops a timer upon detection. Further, the resource handling controller 140 proceeds with at least one action in response to stopping the timer. The at least one action comprising at least one of stopping a timer, re-enabling N1 mode support that was disabled earlier, re-enabling S1 mode support which was disabled earlier, camping on a cell of a previous RAT, proceeding with a 5GMM procedure with an updated CIoT configuration, and proceeding with an EMM procedure with the updated CIoT configuration. The at least one action is applicable to the UE 100, when the UE 100 is in one of an N1 mode and an S1 mode.

The resource handling controller 140 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

Although FIG. 14 shows various hardware components of the UE 100, it is to be understood that other embodiments are not limited thereto. In other embodiments, the UE 100 may include more or fewer components. Further, the labels or names of the components are used only for illustrative purpose and do not limit the scope of the inventive concept. One or more components can be combined together to perform same or substantially similar function in the UE 100.

FIG. 15 shows various hardware components of the network entity 400, according to embodiments disclosed herein. In an embodiment, the network entity 400 includes a processor 410, a communicator 420, a memory 430 and a resource handling controller 440. The processor 410 is coupled with the communicator 420, the memory 430 and the resource handling controller 440.

The resource handling controller 440 determines that a core network redirection for the UE 100 supporting CIoT optimizations is required and paging of the UE 100 is in the IDLE mode. In response to paging, the resource handling controller 440 rejects the subsequent service request with an EMM or 5GMM cause #31.

The resource handling controller 440 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 410 is configured to execute instructions stored in the memory 430 and to perform various processes. The communicator 420 is configured for communicating internally between internal hardware components and with external devices via one or more networks. The memory 430 also stores instructions to be executed by the processor 410. The memory 430 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 430 may, in some examples, be considered a non-transitory storage medium. The term "non-transitory" may indicate that the storage medium is not embodied in a carrier wave or a propagated signal. However, the term "non-transitory" should not be interpreted that the memory 430 is non-movable. In certain examples, a non-transitory storage medium may store data that can, over time, change (e.g., in Random Access Memory (RAM) or cache).

Although FIG. 15 shows various hardware components of the network entity 400 but it is to be understood that other embodiments are not limited thereon. In other embodiments, the network entity 400 may include more or fewer components. Further, the labels or names of the components are used only for illustrative purpose and does not limit the scope of the inventive concept. One or more components can be combined together to perform same or substantially similar function in the network entity 400.

FIG. 16, FIG. 17, FIG. 18, FIG. 19 and FIG. 20 are flow charts illustrating respective methods S1600, S1700, S1800, S1900 and S2000, implemented by the UE 100, for handling the resource in the wireless network 1000, according to embodiments disclosed herein.

Figure 16:
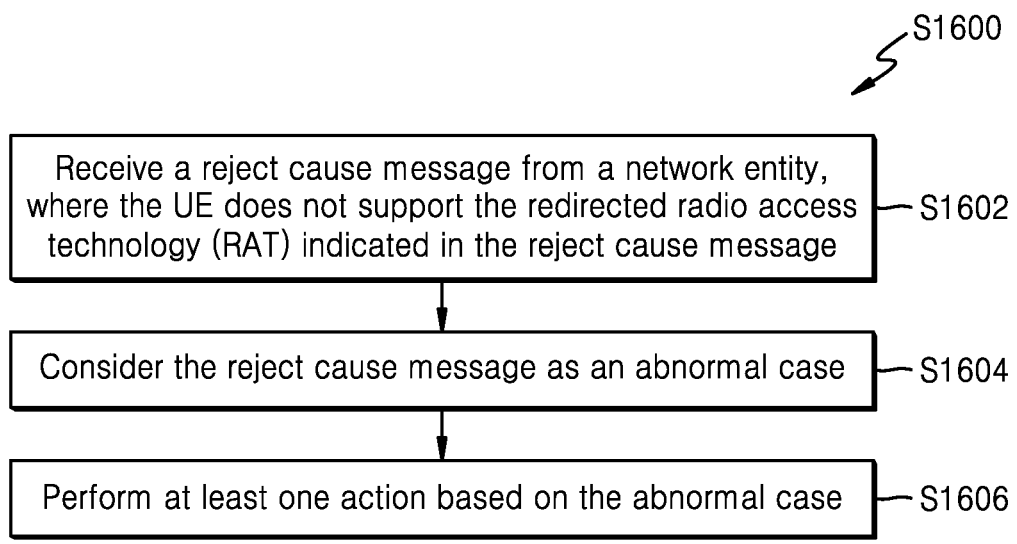
FIG. 16, FIG. 17, FIG. 18, FIG. 19 and FIG. 20 are flow charts illustrating respective methods, implemented by the UE, for handling the resource in the wireless network according to embodiments disclosed herein.

As shown in FIG. 16, the operations S1602-S1606 are handled by the resource handling controller 140. At S1602, the method S1600 includes receiving the reject cause message from the network entity 400. However, in this example the UE 100 does not support the redirected RAT indicated in the reject cause message. At S1604, the method considers the reject cause message as the abnormal case. At S1606, the method performs at least one action based on the abnormal case. The action may be the same as that already explained in FIG. 7 and FIG. 14.

Figure 17:
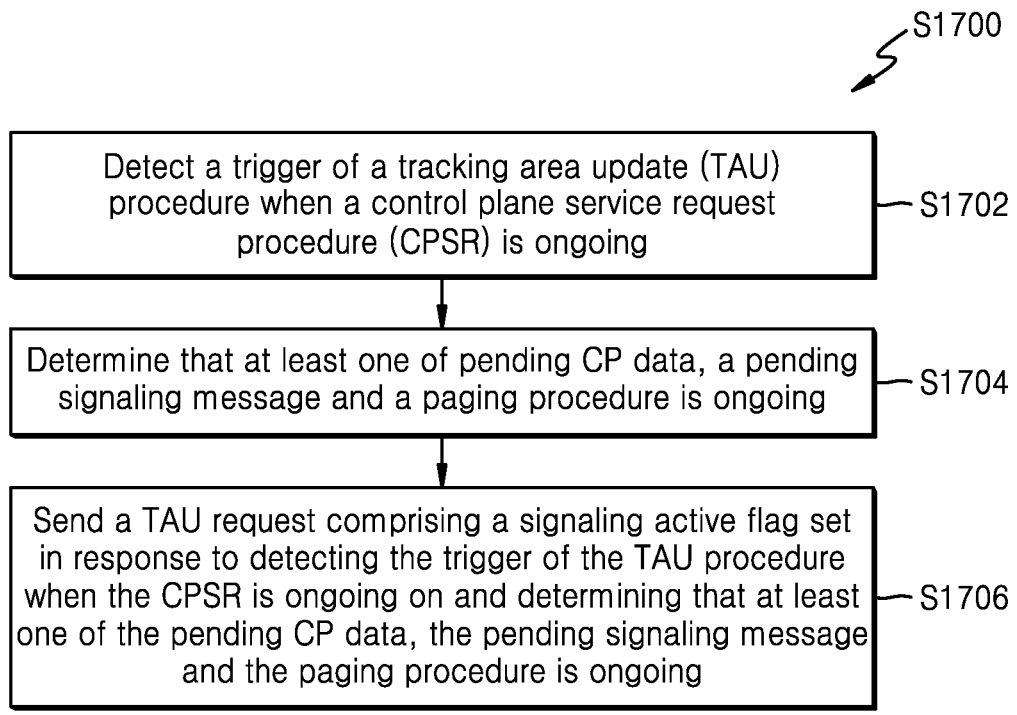

As shown in FIG. 17, the operations S1702-S1706 are handled by the resource handling controller 140. At S1702, the method S1700 includes detecting the trigger of the TAU procedure when the CPSR procedure is ongoing. At S1704, the method determines that at least one of pending CP data, the pending signaling message and the paging procedure is ongoing. At S1706, the method includes sending the TAU REQUEST comprising the signaling active flag set in response to detecting the trigger of the TAU procedure when the CPSR is ongoing on and determining that at least one of the pending CP data, the pending signaling message and the paging procedure is ongoing.

Figure 18:
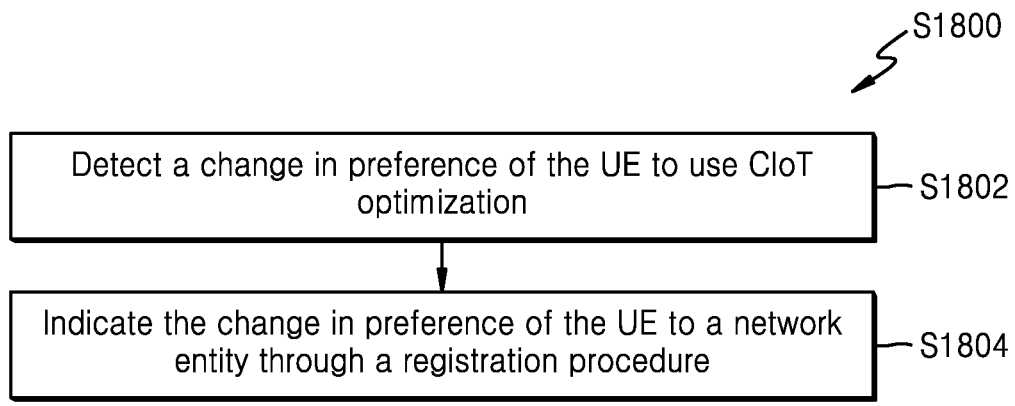

As shown in FIG. 18, the operations S1802 and S1804 are handled by the resource handling controller 140. At S1802, the method includes detecting the change in preference of the UE 100 to use CIoT optimization. At S1804, the method includes indicating the change in preference of the UE 100 to the network entity 400 through the registration procedure.

Figure 19:
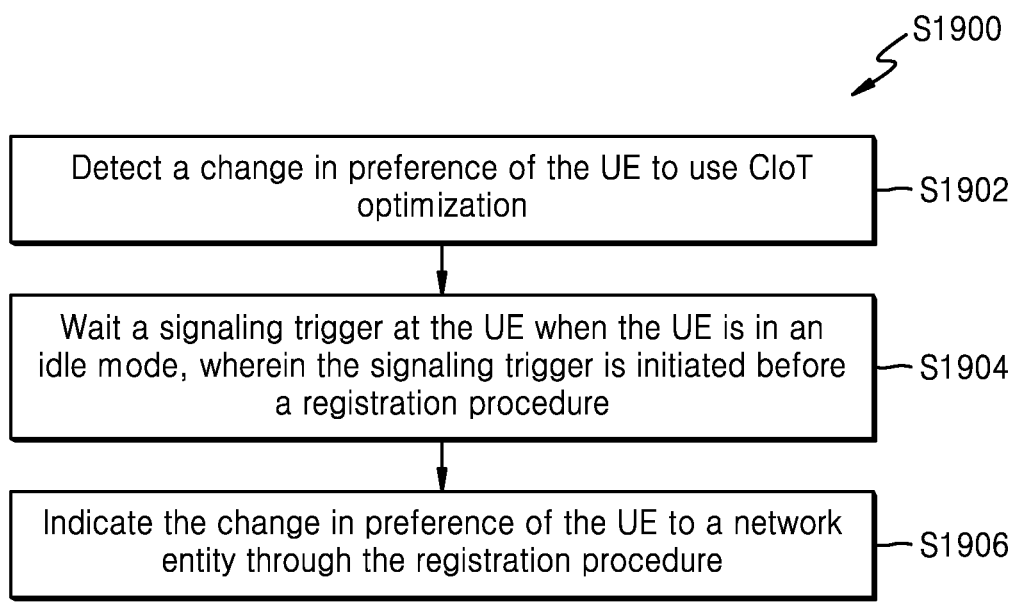

As shown in FIG. 19, the operations S1902-S1906 are handled by the resource handling controller 140. At S1902, the method includes detecting the change in preference of the UE 100 to use CIoT optimization. At S1904, the method includes waiting the signaling trigger at the UE 100 when the UE 100 is in an IDLE mode. The signaling trigger is initiated before the registration procedure. At S1906, the method includes indicating the change in preference of the UE 100 to the network entity 400 through the registration procedure.

Figure 20:
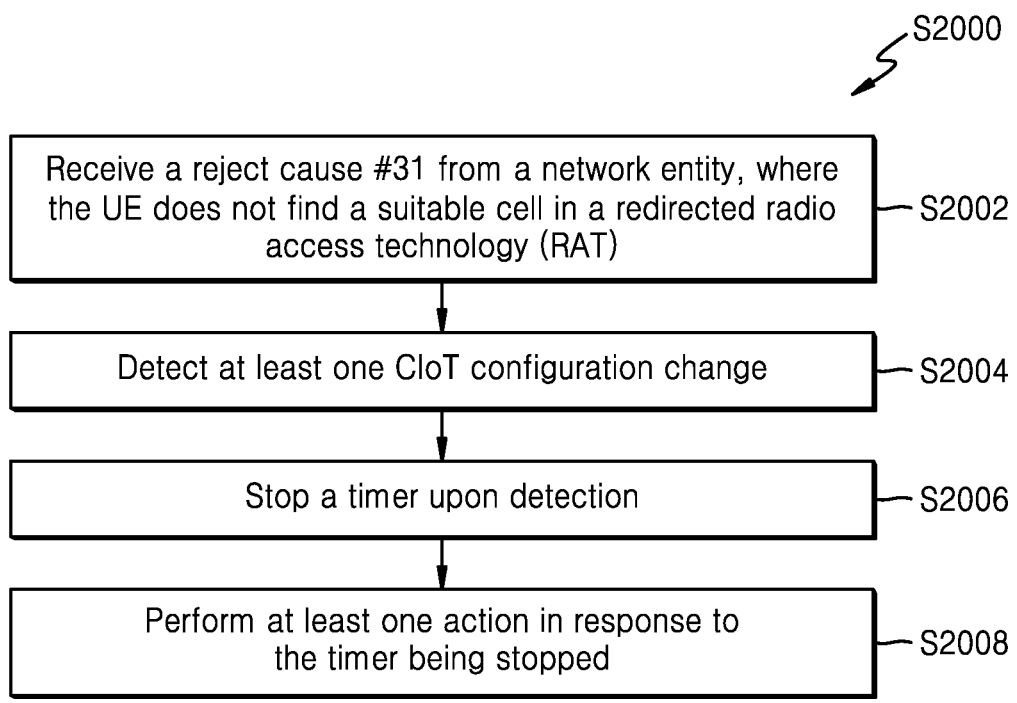

As shown in FIG. 20, the operations S2002-S2008 are handled by the resource handling controller 140. At S2002, the method includes receiving the reject cause #31 from the network entity 400, where the UE 100 does not find a suitable cell in a redirected RAT. At S2004, the method includes detecting at least one CIoT configuration change. At S2006, the method includes stopping the timer upon the preceding detection. At S2008, the method performs at least one action in response to the timer being stopped.

Figure 21:
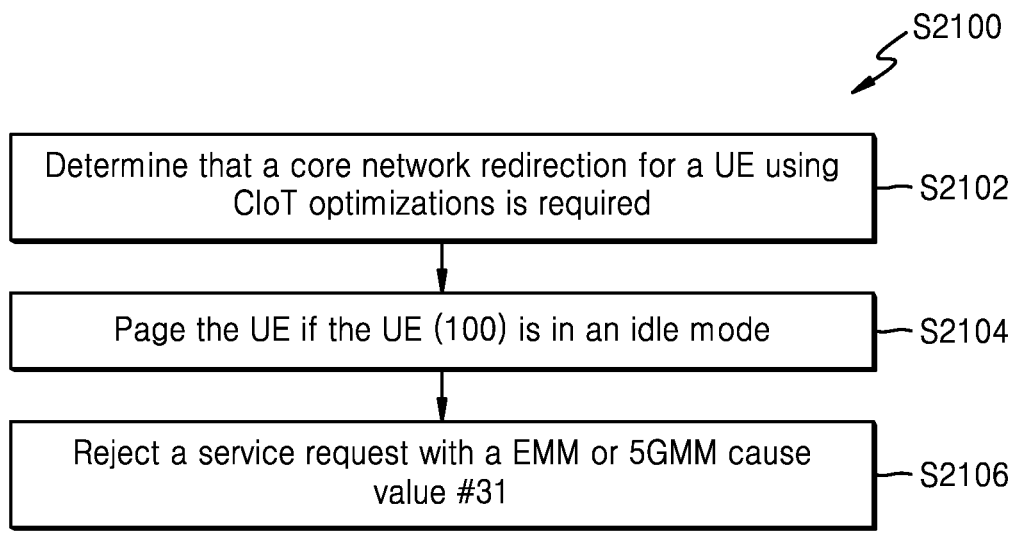
FIG. 21 is a flow chart illustrating a method, implemented by the network entity, for handling the resource in the wireless network, according to embodiments disclosed herein.

FIG. 21 is a flow chart illustrating a method, S2100, that may be implemented by the network entity 400, for handling the resource in the wireless network 1000, according to embodiments disclosed herein.

As shown in FIG. 21, the operations S2102-S2108 are handled by the resource handling controller 440. At S2102, the method includes determining that the core network redirection for the UE 100 using the CIoT optimizations is required. At S2104, the method includes paging the UE 100 if the UE 100 is in the IDLE mode. At S2102, the method includes rejecting the service request with the EMM or the 5GMM cause #31.

The various actions, acts, blocks, steps, or the like in the flow charts for methods S1600-S2100 may be performed in the order presented, in a different order or simultaneously. Further, in some embodiments, some of the actions, acts, blocks, steps, or the like may be omitted, added, modified, skipped, or the like without departing from the scope of the inventive concept.

The embodiments disclosed herein can be implemented through at least one software program running on at least one hardware device and performing network management functions to control the elements. The elements can be at least one of a hardware device, or a combination of a hardware device and a software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments described herein.

We claim:

1. A method performed by a User Equipment (UE) for handling a resource in a wireless network, the method comprising:
   receiving a reject cause message from a network entity, wherein the UE does not support a redirected radio access technology (RAT) indicated in the reject cause message;
   considering the reject cause message to represent an abnormal case;
   performing at least one action based on the abnormal case;
   detecting a change in preference of the UE to use cellular Internet of Things (CIoT) optimization;
   waiting for a signaling trigger, when the UE is in an IDLE mode, wherein the signaling trigger is initiated before a registration procedure; and
   indicating the change in preference of the UE to a network entity through the registration procedure.

2. The method of claim 1, wherein the reject cause message comprises a reject cause #31, wherein the at least one action is performed based on an ongoing procedure of the UE.

3. The method of claim 1, wherein when the UE is in an N1 mode, the at least one action comprises at least one of:
   the UE entering a 5GMM REGISTERED-ATTEMPTING-REGISTRATION state and attempt counter actions are taken during a registration procedure for an initial registration;
   the UE entering one of a 5GMM REGISTERED-ATTEMPTING-REGISTRATION-UPDATE state and a 5GMM REGISTERED-NORMAL-SERVICE state and attempt counter actions are taken during a registration procedure for mobility and periodic registration; and
   the UE enters a 5GMM REGISTERED-NORMAL-SERVICE state and locally releases allocated resources during a service request procedure.

4. The method of claim 1, wherein when the UE is in an S1 mode, the at least one action comprises at least one of:
   the UE entering an EMM DEREGISTERED-ATTEMPTING-TO-ATTACH state and attempt counter actions are taken during an attach procedure;
   the UE entering one of an EMM REGISTERED-ATTEMPTING-TO-UPDATE and an EMM REGISTERED-NORMAL-SERVICE state and attempt counter actions are taken during a TAU procedure; and
   the UE entering an EMM REGISTERED-NORMAL-SERVICE state and locally releases the allocated resources during a service request procedure.

5. The method of claim 1, further comprising, by the UE:
   detecting a trigger of a tracking area update (TAU) procedure due to configuration update or mobility when a control plane service request procedure (CPSR) is ongoing;
   determining that at least one of pending Control Plane (CP) data, a pending signaling message and a paging procedure is ongoing; and
   sending a TAU REQUEST comprising a signaling active flag set in response to detecting the trigger of the TAU procedure when the CPSR is ongoing on and determining that at least one of the pending CP data, the pending signaling message and the paging procedure is ongoing.

6. The method of claim 1, further comprising:
   paging, by a network entity in the wireless network, the UE when the UE is in an IDLE mode upon determining that a core network redirection for the UE supporting Cellular Internet of Things (CIOT) optimizations is required; and
   rejecting, by the network entity, a subsequent service request with at least one of an EMM or a 5GMM cause #31 in response to paging.

7. The method of claim 6, wherein the network entity comprises at least one of an Access and Mobility Management Function (AMF) entity and a Mobility management Entity (MME) entity.

8. The method of claim 1, further comprising:
   detecting, by the UE, a change in preference of the UE to use a Cellular Internet of Things (CIoT) optimization; and
   indicating, by the UE, the change in preference of the UE to a network entity in the wireless network through a registration procedure.

9. The method of claim 8, wherein the change in preference comprises a change to use at least one of control plane CIOT optimization and user plane CIOT optimization.

10. The method of claim 1, wherein the CIoT optimization is at least one of a control plane CIOT optimization and a user plane CIOT optimization.

11. A method performed by a User Equipment (UE) for handling a resource in a wireless network, the method comprising:
   receiving a reject cause #31 from a network entity;
   searching for, but not finding, a suitable cell in a redirected radio access technology (RAT) indicated in the reject cause #31;
   detecting at least one cellular Internet of Things (CIoT) configuration change;
   stopping a timer upon the detection; and
   performing at least one action in response to the timer being stopped.

12. The method of claim 11, wherein the at least one action comprises at least one re-enabling N1 mode support which was disabled earlier, re-enabling S1 mode support which was disabled earlier, camping on a cell of a previous RAT, proceeding with a 5GMM procedure with an updated CIOT configuration, and proceeding with an EMM procedure with the updated CIOT configuration.

13. The method of claim 11, wherein the at least one action is applicable to the UE when the UE is in one of an N1 mode and an S1 mode.

14. A User Equipment (UE) for handling a resource in a wireless network, comprising:
   a processor;
   a memory; and
   a resource handling controller, coupled to the processor and the memory, configured to:
      receive a reject cause message from a network entity in the wireless network, wherein the UE does not support a redirected radio access technology (RAT) indicated in the reject cause message;
      consider the reject cause message to represents an abnormal case; and
      perform at least one action based on the abnormal case;
      detect a change in preference of the UE to use cellular Internet of Things (CIoT) optimization;
      wait for a signaling trigger at the UE when the UE is in an IDLE mode, wherein the signaling trigger is initiated before a registration procedure; and
      indicate the change in preference of the UE to a network entity in the wireless network through the registration procedure.

15. The UE of claim 14, wherein the resource handling controller is further configured to:
   detect a trigger of a tracking area update (TAU) procedure when a control plane service request procedure (CPSR) is ongoing;
   determine that at least one of pending Control Plane (CP) data, a pending signaling message and a paging procedure is ongoing; and
   send a TAU REQUEST comprising a signaling active flag set in response to detecting the trigger of the TAU procedure when the CPSR is ongoing on and determine that at least one of the pending CP data, the pending signaling message and the paging procedure is ongoing.

16. The UE of claim 14, wherein the resource handling controller is further configured to:
   detect a change in preference of the UE to use CIOT optimization; and
   indicate the change in preference of the UE to a network entity of the wireless network through a registration procedure.

17. The UE of claim 14, wherein the resource handling controller is further configured to:
   receive a reject cause #31 from a network entity, wherein the UE does not find a suitable cell in a redirected radio access technology (RAT);
   detect at least one CIOT configuration change;
   stop a timer upon detection; and
   perform at least one action in response to the timer being stopped.

* * * * *